United States Patent
Polo et al.

(10) Patent No.: US 10,440,546 B2
(45) Date of Patent: Oct. 8, 2019

(54) BLUETOOTH LOW ENERGY AUTOMATION MESH NETWORK

(71) Applicant: Avago Technologies General IP (Singapore) Pte. Ltd., Singapore (SG)

(72) Inventors: Angel Polo, Solana Beach, CA (US); Guoxin Xie, San Diego, CA (US); David Hsu, Cupertino, CA (US); Khan M. Muneer, San Diego, CA (US); Xin Tian, San Diego, CA (US); Wenbin Yu, San Diego, CA (US); Victor G. Zhodzishsky, Potomac, MD (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/107,874

(22) Filed: Aug. 21, 2018

(65) Prior Publication Data
US 2018/0359624 A1    Dec. 13, 2018

Related U.S. Application Data

(63) Continuation of application No. 14/857,781, filed on Sep. 17, 2015, now Pat. No. 10,111,071.

(60) Provisional application No. 62/053,058, filed on Sep. 19, 2014.

(51) Int. Cl.
| | |
|---|---|
| *H04W 4/80* | (2018.01) |
| *H04W 88/04* | (2009.01) |
| *H04W 84/18* | (2009.01) |
| *H04W 40/02* | (2009.01) |

(52) U.S. Cl.
CPC ............. *H04W 4/80* (2018.02); *H04W 88/04* (2013.01); *H04W 40/02* (2013.01); *H04W 84/18* (2013.01); *Y02D 70/00* (2018.01); *Y02D 70/142* (2018.01); *Y02D 70/144* (2018.01); *Y02D 70/162* (2018.01); *Y02D 70/164* (2018.01); *Y02D 70/22* (2018.01); *Y02D 70/30* (2018.01)

(58) Field of Classification Search
None
See application file for complete search history.

(56) References Cited

U.S. PATENT DOCUMENTS

| | | | |
|---|---|---|---|
| 7,177,295 B1 * | 2/2007 | Sholander | ............... H04L 45/30 370/338 |
| 2005/0060417 A1 | 3/2005 | Rose | |
| 2006/0087993 A1 | 4/2006 | Sengupta et al. | |
| 2009/0097438 A1 | 4/2009 | Kneckt et al. | |
| 2009/0138713 A1 | 5/2009 | Veillette | |
| 2011/0016227 A1 | 1/2011 | Feng et al. | |
| 2011/0107436 A1 | 5/2011 | Cholas et al. | |

(Continued)

FOREIGN PATENT DOCUMENTS

WO    WO-2010/027495 A1    3/2010

*Primary Examiner* — Ajit Patel
*Assistant Examiner* — Richard Schnell
(74) *Attorney, Agent, or Firm* — Morgan, Lewis & Bockius LLP

(57) ABSTRACT

A system for facilitating communications in a mesh network is provided. One or more devices of the mesh network may participate as routing nodes to provide range extension for any other devices in the mesh network that would otherwise be out of range from one another. In one or more implementations, Bluetooth Low Energy (BLE) may be used as the physical transport of the mesh network.

20 Claims, 14 Drawing Sheets

(56) References Cited

U.S. PATENT DOCUMENTS

| | | |
|---|---|---|
| 2011/0164527 A1 | 7/2011 | Mishra et al. |
| 2011/0319020 A1 | 12/2011 | Desai et al. |
| 2012/0322466 A1 | 12/2012 | Das et al. |
| 2014/0097966 A1 | 4/2014 | Alexander |
| 2014/0122580 A1* | 5/2014 | Nuaimi ............... H04L 63/0281 709/203 |
| 2015/0172391 A1 | 6/2015 | Kasslin et al. |
| 2015/0358777 A1 | 12/2015 | Gupta |

* cited by examiner

Map of all nodes that are reachable.

Map of all nodes that are directly adjacent.

| Pkt Cntr LSB 1802 | DST ID 1804 | Payload 1806 | MIC 1808 |

1800

| DST ID 1902 | Payload 1904 |

1900

| Pkt Cntr LSB 2002 | CTRL 2004 | DST ID 2006 | CTRL 2008 | ... | DST ID 2010 | CTRL 2012 |

| Pkt Cntr LSB 2102 | DST ID 2104 | Net Pkt Cntr LSB 2110 | Payload 2106 | MIC 2108 |

| DST ID 2202 | Net Pkt Cntr LSB 2206 | Payload 2204 |

↙ 2200

FIG. 22

BLUETOOTH LOW ENERGY AUTOMATION MESH NETWORK

CROSS-REFERENCE TO RELATED APPLICATIONS

This application is a continuation application of U.S. application Ser. No. 14/857,781, filed Sep. 17, 2015, entitled "Bluetooth Low Energy Automation Mesh Network", which claims the benefit of U.S. Provisional Patent Application No. 62/053,058, filed on Sep. 19, 2014, entitled "Bluetooth Low Energy Automation Mesh," which are hereby incorporated by reference in their entirety.

TECHNICAL FIELD

The present description relates generally to wireless communications, including a Bluetooth Low Energy automation mesh network.

BACKGROUND

Bluetooth Low Energy (BLE) devices may have a communication range that is less than one hundred meters, for example. Thus, transmissions from a BLE device may not reach other BLE devices that are located more than approximately fifty meters away.

BRIEF DESCRIPTION OF THE DRAWINGS

Certain features of the subject technology are set forth in the appended claims. However, for purpose of explanation, several embodiments of the subject technology are set forth in the following figures.

FIGS. 18 through 22 illustrate examples of packets that may be included as payload in a mesh packet in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject technology allows for utilizing BLE to communicate through a mesh network. The subject technology may be used, for example, to provide a mesh aware environment for communicating automation protocols through a mesh network and/or to secure a mesh network from unauthorized access.

Figure 1:
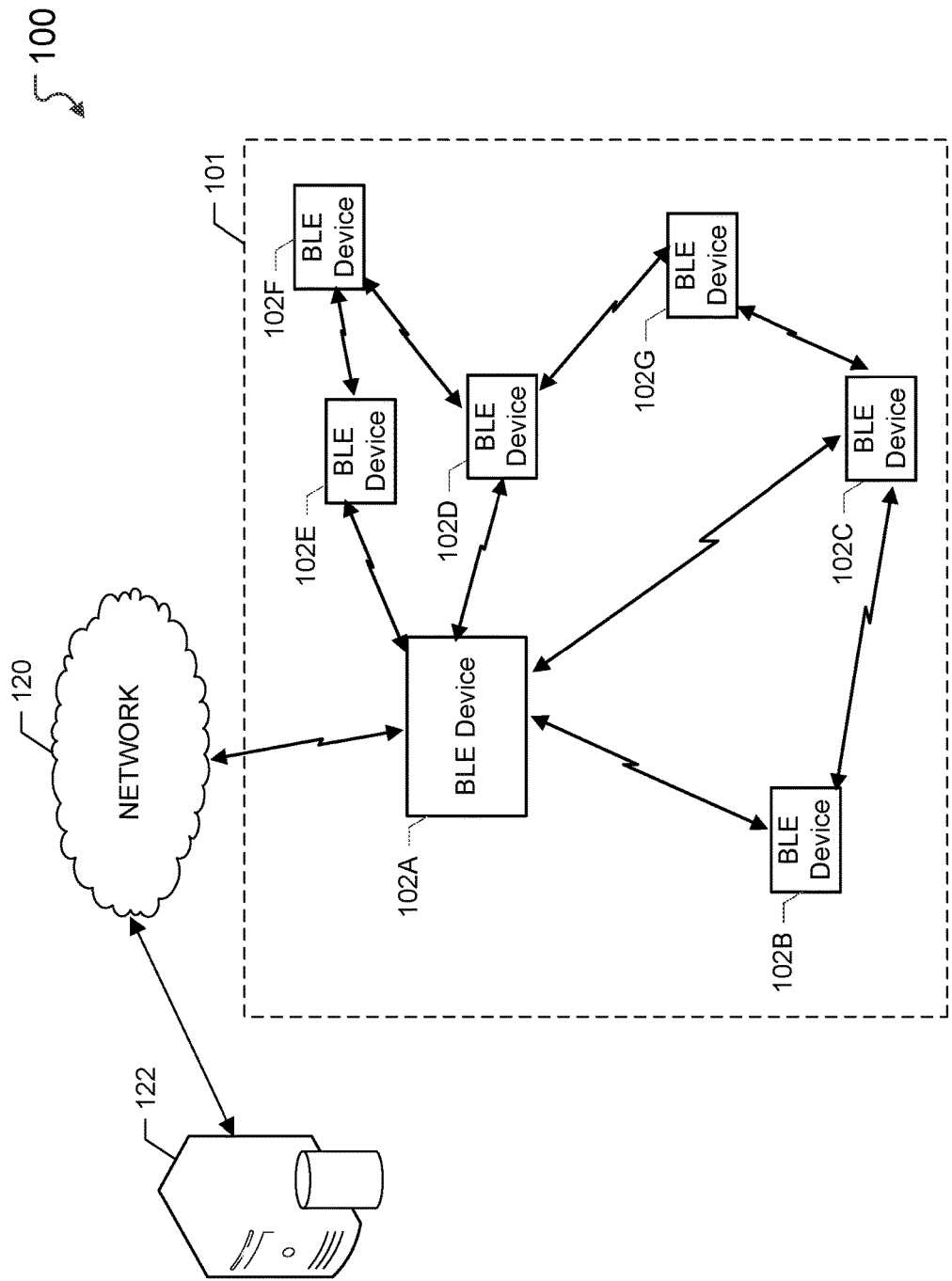
FIG. 1 illustrates an example network environment that includes of a BLE automation mesh network in accordance with one or more implementations.

FIG. 1 illustrates an example network environment 100 that includes a BLE automation mesh network 101, in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The BLE automation mesh network 101 may include BLE devices 102A-G. The BLE devices 102A-G may be any device that may engage in BLE communications. Such devices may be, may include, or may be a part of, by way of non-limiting example, mobile phones; tablets; computers; personal digital assistants (PDAs); video game devices; garage doors; garage door openers; alarm panel; light switches; individual interior and exterior lighting; heat, ventilation, and air conditioning (HVAC) systems, home security systems, multimedia devices (e.g., televisions, set top boxes, receivers, etc.), pet tags, appliances (e.g., coffee makers, refrigerators, washing machines, etc.), windows, automatic shades, locks, fitness devices, medical devices, monitoring devices, baby monitor; smoke detectors; carbon monoxide detectors; carbon dioxide detectors; and/or chips embedded within or otherwise coupled to any device. Although the BLE automation mesh network 101 includes seven BLE devices 102A-G, the BLE automation mesh network 101 may include more, fewer, and/or different BLE devices. One or more of the BLE devices 102A-G may be considered a node of the BLE automation mesh network 101. As used herein, a node/member of the BLE automation mesh network 101 may be referred to as a device, a mesh device, a mesh network device, a node, a mesh node, or a mesh network node of the BLE automation mesh network 101.

As an example, the BLE device 102A may be, may include, or may be part of, a smartphone, while the BLE devices 102B and 102C may be, or may include, light emitting devices (or sensors embedded in the light emitting devices). In such a case, the BLE device 102A may communicate with the BLE devices 102B and 102C and provide instructions to the BLE devices 102B and 102C that, when executed by the BLE devices 102B and 102C, turn on or off the light emitting devices.

As another example, the BLE device 102A may be, may include, or may be a part of, a computer, the BLE devices 102F and 102G may be health monitoring devices, and the BLE device 102D may be a device for analyzing and processing information received from the BLE devices 102F and 102G, e.g. the health monitoring devices. In this case, the BLE device 102F and the BLE device 102G may provide information associated with a patient (e.g., heart rate, glucose levels, temperature, and so forth) to the BLE device 102D. The BLE device 102D may process the information from the BLE devices 102F and 102G to generate an output (e.g., graph of information associated with the patient over time) that may be displayed by the BLE device 102A.

One or more of the BLE devices 102A-G, such as the BLE device 102A, may maintain simultaneous direct connections with one or more other BLE devices 102B-G. In one or more implementations, the number of maintained simultaneous connections may be limited by resources available to the BLE devices 102A-G, such as resources for scheduling, handshaking, saving data to memory, and so forth. Each of the BLE devices 102A-G shown in FIG. 1 may communicate with any of the other BLE devices 102A-G in the network environment 100. For example, the BLE devices 102A and 102G may be considered as communicating with each other if a packet originating from the BLE device 102A can be transmitted to the BLE device 102G, and vice versa, with or without one or more intermediate devices (e.g., the BLE device 102D) forwarding the packet. The utilization of intermediate devices of the BLE automation mesh network 101 for forwarding of a packet allows for communication between devices of the BLE automation mesh network 101 that are multiple hops away from each other. Thus, a distance for successful transmissions between an originator node (e.g. the BLE device 102A) of a packet and an end node (e.g., a destination node, such as the BLE device 102G) of the packet may be extended beyond a distance generally achievable by direct BLE connections (e.g., around a hundred meters).

In one or more implementations, the BLE devices 102A-G in the network environment 100 operate in accordance with a Bluetooth Low Energy standard, such as the Bluetooth 4.1 specification.

In one or more implementations, systems and methods are provided to facilitate implementation of secure, prioritized, cluster oriented, ad-hoc mesh networks for automation purposes using BLE as the physical transport. The BLE automation mesh network 101 may be, may include, or may be a part of, such a mesh network. A cluster may denote a group of BLE-enabled devices, e.g. the BLE devices 102A-G, that are identifiable to one another and may participate as routing nodes to provide range extension for any two participant BLE devices that would otherwise be out of BLE transmission range from each other, such as the BLE device 102A and the BLE device 102G.

In one or more implementations, an ad-hoc mesh network may utilize a mesh association mechanism that does not use a central coordinator node and/or may not be dependent on a single point of failure. A secure mesh network may utilize an admission policy that a device needs to satisfy in order to become a member (e.g., a node) of the mesh network and to participate in traffic forwarding within the mesh network. Security features may include use of message based authentication and 128-bit Advanced Encryption Standard (AES-128) network encryption between any two end devices of the mesh network. An automation mesh network may utilize small message payloads, such as 15 bytes. A prioritized mesh network may allow for end device organization into groups.

The BLE automation mesh network 101 may be set up by a user to allow connectivity between various BLE-enabled devices, e.g. the BLE devices 102A-G. In one or more implementations, the BLE automation mesh network 101 includes at least one controlling device and at least one administrator device. The administrator device and the controlling device may be the same device or separate devices. the controlling device may be a device of the BLE automation mesh network 101 that sends commands and/or controls other devices within the BLE automation mesh network 101. The controlling device may be in communication with a sensor device, which is a device of the BLE automation mesh network 101 that may receive commands (e.g., read/write commands) from a controlling device and/or may send alerts/notifications (e.g., based on sensed data) to a controlling device. For example, the BLE device 102B and the BLE device 102C may be light emitting devices that are controllable by the BLE device 102A. The BLE device 102A may send instructions to turn one or both of the BLE device 102B and the BLE device 102C on or off.

The administrator device may be a device of the BLE automation mesh network 101 that has access to a central authority database and may add devices to and remove devices from the BLE automation mesh network 101. The central authority database may be accessible to all the administrator devices of the BLE automation mesh network 101 and may be stored by a single administrator device, stored by one or more administrator devices, and/or stored on a cloud and accessible with proper credentials. In some cases, such as when the central authority database is stored on a cloud remote from the administrator device(s) of the BLE automation mesh network 101, an application (e.g., running on the administrator device(s)) may need to access the central authority database using out of band methods (e.g., WiFi). The central authority database is generally secured, which in turn facilitates providing security for the BLE automation mesh network 101. The central authority database may be secured using a separate key database for example, although other manners by which to secure the central authority database may be utilized.

Information contained the central authority database may include, by way of non-limiting example, common network mesh keys, listing of all participant devices and related operational characteristics, device group membership lists, and CCM packet counter distribution. For example, the central security database may be utilized to hold security and network credentials for devices that are members of the BLE automation mesh network 101. The listing of participant devices may identify each individual device as being a wall switch, a door sensor, a remote control, etc. as well as identify each individual device by its assigned node identifier (ID) and any associated group IDs.

With reference to FIG. 1, the BLE device 102A may be an administrator device that stores the central authority database. For example, the BLE device 102A may be an administrator device that may access, through a network 120, a central authority database that is stored on a server 122. In this case, the BLE device 102A may or may not locally store the central authority database. The network 120 may include a local area network ("LAN"), a wide area network ("WAN"), or an Intranet, or a network of networks, such as the Internet. A smart device, such as a smart phone or tablet, may be utilized as an administrator device that associates devices into the BLE automation mesh network 101. In one or more implementations, any authenticated device (e.g., authenticated smart device) may be utilized as an administrator node that associates devices into the BLE automation mesh network 101 given proper security credentials (e.g., access control).

In some cases, the administrator device may associate a device into the BLE automation mesh network 101 by establishing a BLE connection with the device and exchanging credentials that are retrieved from the central authority database. The device to be associated into the BLE automation mesh network 101 may be introduced by a user. For example, the device may be a light emitting device that the user has installed, such as a smart light bulb. The user may be utilizing an application to connect the light emitting device to the BLE automation mesh network 101.

When a device is being associated into the BLE automation mesh network 101, an administrator device of the BLE automation mesh network 101 assigns the device a node ID as part of the association. Each of the devices of the BLE automation mesh network 101, such as each of BLE devices 102A-G in FIG. 1, has an assigned node ID. Designated groups of devices may be assigned a group ID. For example, the BLE devices 102B and 102C may be, or may include, light emitting devices that are controlled by the BLE device 102A. The administrator device may assign a group ID to the BLE devices 102B and 102C to facilitate control the BLE devices 102B and 102C through the use of the assigned group ID. For example, a user may utilize an application to connect the BLE devices 102B and 102C to the BLE device 102A such that the BLE device 102A may control operation of the BLE devices 102B and 102C. The user's connection may cause the administrator device to assign a group ID to the BLE devices 102B and 102C.

The addressable space for node IDs and group IDs may be shared. The addressable space may be represented using 1 byte of data to allow support of 255 individual IDs. For example, node IDs may start from 0 and may be assigned in ascending order while group IDs may start from 254 and may be assigned in descending order. The IDs may not overlap. A device of the BLE automation mesh network 101 may be associated with multiple group IDs. In some cases, more or less than 1 byte of data may be utilized for the addressable space such that the number of supported individual IDs may be higher or lower, respectively, than 255 individual IDs. The number 255 may be reserved for other purposes and may not be used as a node ID or a group ID, as will be discussed further below with respect to FIG. 2, for example. In some cases, each device of the BLE automation mesh network 101 may be assigned multiple node IDs. For example, the device may have different node IDs for different applications (e.g., volume control, baby monitor aperture settings) associated with the device.

In one or more implementations, the BLE automation mesh network 101 is a broadcast-based mesh network. Each of the mesh devices may be mesh aware (e.g., aware of its being part of the BLE automation mesh network 101). Thus, legacy BLE devices that do not support participation in a mesh network may be incompatible with such a mesh network. Devices and/or groups of devices may be addressed using a node ID and/or a group ID. Packets may originate from any device of the BLE automation mesh network 101 and may be potentially rebroadcast from the devices. Any device of the BLE automation mesh network 101 may broadcast each packet multiple times to increase a likelihood that the packet has been received at least once by each of the devices one hop away from the device. However, jitter may be introduced with each retransmission (e.g., packet forwarding) in the BLE automation mesh network 101. The jitter may include a time delay injected by a routing device between the time a packet is received by the routing device and a time the packet is forwarded by the routing device. The jitter may facilitate addition of an offset of one device's transmission from another device's transmission to reduce or avoid collision.

Any device in the BLE automation mesh network 101, such as any one of the BLE devices 102A-G of FIG. 1, may be utilized as a routing device to rebroadcast mesh packets. For example, a routing device that receives a broadcasted mesh packet may rebroadcast the mesh packet. Prior to rebroadcasting the mesh packet, the routing device may authenticate a packet as belonging to the BLE automation mesh network 101. A routing device may also be referred to as a forwarding device. To enhance robustness of the BLE automation mesh network 101, each device may need to be reachable by more than one device in order to prevent disparate device islands when a device is removed from the BLE automation mesh network 101 (e.g., the device goes offline). The BLE automation mesh network 101 may allow a device of the BLE automation mesh network 101 to query a status of the other devices of the BLE automation mesh network 101. For example, one device may broadcast a query packet and determine its neighboring devices based on responses to the query packet. In some cases, the BLE automation mesh network 101 may allow support of intelligent broadcast routing of messages.

When a device is to be associated into the BLE automation mesh network 101, an administrator device may assign a mesh network key to the device. For example, the administrator device that assigns the mesh network key to the device may also assign a node ID to the device. The mesh network key may be utilized by each device of the BLE automation mesh network 101 to allow secure communications within the BLE automation mesh network 101. The mesh network key is shared by each of the devices of the BLE automation mesh network 101 and may be referred to as a network-wide key. When two devices of the BLE automation mesh network 101 are to be associated with each other within the BLE automation mesh network 101, the two devices may request that an administrator device assign a pair-wise key and the administrator device may assign the pair-wise key. The pair-wise key facilitates point-to-point access control within the BLE automation mesh network 101. Payloads with the BLE automation mesh network 101 may utilize encryption and message authentication. The payloads may be encrypted and signed using AES-CCM (Advanced Encryption Standard Counter with Cipher Block Chaining Message Authentication Code) encryption and message authentication.

In one or more implementations, the BLE automation mesh network 101 may be utilized in an environment, such as a home environment, in which some devices that control automation in the BLE automation mesh network 101 are continuously active online. These devices may be operated at or near 100% radio frequency (RF) duty cycle and may be mains powered (e.g., wall powered) and/or powered by larger batteries. These devices may be utilized to provide constant linkage for the BLE automation mesh network 101 and continuously provide data routing and forwarding functionality throughout the BLE automation mesh network 101. The continuously active online devices may be referred to as forwarding devices. The forwarding devices are generally associated with larger and more sustainable power source and a higher receiver duty cycle.

Other devices that control automation within the BLE automation mesh network 101 need not be mains powered, since the devices may issue a message (e.g., a command, status, or alert) to another device of the BLE automation mesh network 101 and then turn themselves off after issuing the message. These devices may be operated at a lower RF duty cycle. Thus, these devices are not consistently active online and may not continuously provide data routing and forwarding functionality throughout the BLE automation mesh network 101. Operation of these devices may be based on their respective power profiles. Examples of these devices include platforms such as smart phones, laptops, tablets, remote controls, switches, door sensors, etc. They may issue messages to other devices in the BLE automation mesh network 101, such as a television, garage door opener, alarm system, door lock, light switch, etc.

In some aspects, devices powered by smaller batteries or are otherwise power-constrained may receive and react to messages from other devices of the BLE automation mesh network 101. The messages may arrive at uncoordinated times. These devices may be referred to as low power sensor devices. The low power sensor devices may need to at least periodically scan for packets (e.g., periodically turn on their respective radios) in order to receive messages. A periodicity of their respective receiver duty cycle may be based on their respective battery profile. Examples of the low power sensor devices may include battery-powered baby monitors, mobile light emitting devices, door locks, HVAC vent actuators, smoke detectors, etc.

In one or more implementations, a burst mode operation is utilized to facilitate operation of the low power sensor devices in the BLE automation mesh network 101. In the BLE automation mesh network 101, the low power sensor device is generally one hop away from at least one forwarding device with a larger and more sustainable power source and a higher receiver duty cycle. In some cases, the low power sensor devices may be configured to not forward received messages (e.g., to not serve as forwarding nodes) in order to conserve battery life. The burst mode operation may be utilized to facilitate forwarding of messages to the low power sensor device by a last hop forwarding device associated with the low power sensor device. Such a last hop forwarding device may be referred to as a proxy device of the low power sensor device.

The proxy device may be a device with a consistent power supply that receives and caches messages on behalf of lower power devices, such as low power sensor devices, and periodically transmits the cached messages to the lower power devices in response to requests from the low power sensor devices. For example, the BLE devices 102F and 102G may be low power sensor devices that utilize the BLE device 102D as a proxy device. In this case, packets that are received by the BLE device 102D that are addressed to the BLE devices 102F and/or 102G are forwarded to BLE devices 102F and/or 102G by the BLE device 102D. In a case that the BLE device 102D and 102E receive a packet (e.g., from the BLE device 102A) addressed to the BLE device 102F, the BLE device 102D, as the proxy device associated with the BLE device 102F, will forward the packet to the BLE device 102F whereas the BLE device 102E may discard the packet. The proxy devices may facilitate reception of packets from the BLE automation mesh network 101 by their associated lower power devices in a power efficient manner. In some cases, the proxy devices may have device specific constraints that may limit how many times within a predetermined time duration the proxy devices may compete to serve as a proxy device of a lower power device.

Figure 2:
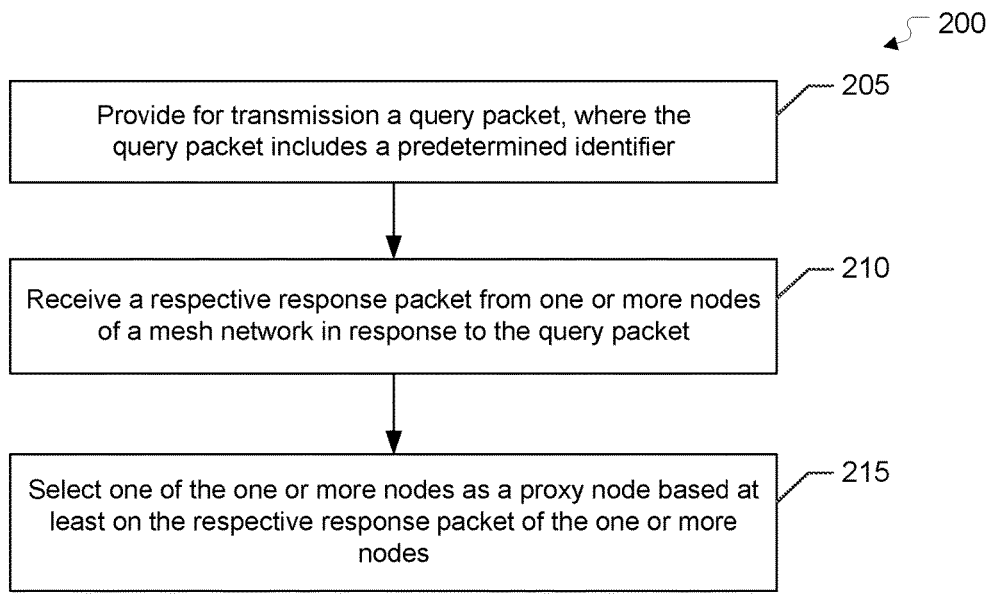
FIGS. 2 through 4 illustrate flow diagrams of example processes of proxy device selection in a BLE automation mesh network in accordance with one or more implementations.

FIG. 2 illustrates a flow diagram of an example process 200 of proxy device selection in a BLE automation mesh network in accordance with one or more implementations. For explanatory purposes, the example process 200 is described herein with reference to the BLE devices 102D-F of the BLE automation mesh network 101 of FIG. 1; however, the example process 200 is not limited to the BLE devices 102D-F of the BLE automation mesh network 101 of FIG. 1. The blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

For explanatory purposes, with reference to FIG. 2, the BLE device 102F is a low power sensor device and the BLE devices 102D and 102E may be forwarding devices or otherwise devices that are powered by larger power sources (e.g., mains power, larger batteries) and associated with higher duty cycles than the BLE device 102F. The BLE devices 102D and 102E are candidate proxy devices of the BLE device 102F. The proxy device of the BLE device 102F may be utilized to forward mesh packets addressed to the BLE device 102F. The mesh packets may have the format of a BLE link layer packet structure 1010 of FIG. 10, which will be discussed further below with respect to FIG. 10.

A low power device of the BLE automation mesh network 101 that has not selected an associated proxy device for the BLE automation mesh network 101, such as the BLE device 102F, transmits a proxy query packet over the BLE automation mesh network 101 (205). The BLE device 102F may broadcast the proxy query packet over the BLE automation mesh network 101. The proxy query packet may include a predetermined identifier in a proxy ID field of the proxy query packet, where the predetermined identifier indicates that the BLE device 102F has not yet selected an associated proxy device. By containing the predetermined identifier, the proxy ID field may also indicate that only devices one hop away from the BLE device 102F should respond. In this regard, the devices one hop away from the BLE device 102F do not forward the proxy query packet to other devices of the BLE automation mesh network 101.

For example, when the node IDs and group IDs of devices of the BLE automation mesh network 101 are represented by 1 byte, the predetermined identifier may be 0xFF (e.g., decimal value 255) whereas the node IDs and group IDs fall within 0x00 (e.g., decimal value 0) and 0xFE (e.g., decimal value 254). In one or more implementations, the proxy query packet that is transmitted is included in a payload field of a mesh protocol data unit (PDU), which in turn is a part of a link layer packet. An example format for the link layer packet and the proxy query packet will be discussed further below with reference to a BLE link layer packet structure 1010 and a packet 1200 of FIGS. 10 and 12, respectively.

The BLE device 102F receives a respective proxy response packet from the BLE devices 102D and 102E that received the proxy query packet (210). The proxy response packets may include a power value associated with the proxy query packet. For example, the proxy response packet from the BLE device 102D may include a received signal strength indicator (RSSI) value that is indicative of a power present in the proxy query packet when the proxy query packet was received by the BLE device 102D. The proxy response packet may be included in a payload field of a mesh PDU, which in turn is a part of a link layer packet.

The BLE device 102F selects one of the BLE devices 102D and 102E as its proxy device based at least on the respective proxy response packets received from the BLE devices 102D and 102E (215). For example, the BLE device 102F may determine statistics associated with the BLE devices 102D and 102E, such as a number of proxy response packets received from each of the BLE devices 102D and 102E, RSSI values associated with the proxy response packets, and the like, and may select one of the BLE devices 102D and 102E to operate as its proxy device based on the determined statistics. The RSSI values associated with the proxy response packets may include RSSI values contained in the proxy response packets and/or RSSI values associated with the transmission of the proxy response packets as measured by the BLE device 102F when the packets are received from the BLE device 102F. In some cases, when selecting a proxy device, the BLE device 102F utilizes the RSSI values of the proxy response packets as measured by the BLE device 102F when the packets are received rather than any RSSI values contained in the proxy response packet.

The BLE device 102F may transmit (e.g., broadcast) multiple proxy query packets and receive proxy response packets from each of the BLE devices 102D and 102E for at least some of the proxy query packets. The BLE device 102F may select the device (e.g., the BLE device 102D or 102E) that is associated with higher RSSI values (e.g., a higher average RSSI value) and/or from which a higher number of proxy response packets is received, to operate as its proxy device.

In one or more implementations, the BLE device 102F enters a higher duty cycle query period when the BLE device 102F initializes selection of its proxy device or is attempting to reestablish selection of its proxy device. During the higher duty cycle query period, the BLE device 102F transmits proxy query packets, receives proxy response packets from devices of the BLE automation mesh network 101 (e.g., the BLE devices 102D and 102E) reachable by one hop, and selects one of these devices as its proxy device based at least on the proxy response packets.

For example, during the higher duty cycle query period, the BLE device 102F may transmit (e.g., broadcast) a query packet once every 20 to 100 ms, whereas, during a lower duty cycle query period, the BLE device 102F may transmit (e.g., broadcast) a query packet once every 5 to 10 seconds. As another example, during the lower duty cycle query period, the BLE device 102F may transmit a query packet once every 5 to 10 minutes. At times when the BLE device 102F is not transmitting query packets, and is waiting for a response to previously transmitted query packets, the BLE device 102F may be in a low power state (e.g., a sleep state) to allow conservation of power and/or preservation of battery life. The time periods associated with the duty cycle query periods may be based on a power profile of the BLE device 102F and/or an application of the BLE device 102F. For example, the time interval between the transmission of one query packet and the transmission of a next query packet by the BLE device 102F may be shorter when the BLE device 102F is associated with time-sensitive applications.

The BLE device 102F may transition from the higher duty cycle query period back to the lower duty cycle query period once the BLE device 102F has selected its proxy device. In some cases, the BLE device 102F may transition from the higher duty cycle query period back to the lower duty cycle query period if the BLE device 102F is unable to select a suitable proxy device after the BLE device 102F has transmitted a predetermined number of proxy query requests. In such cases, the BLE device 102F may re-execute proxy device selection at a later time.

The BLE device 102F may automatically initialize selection of its proxy device when the BLE device 102F is powered on. The BLE device 102F may re-execute proxy device selection when, for example, a current proxy association is not effective (e.g., packets are not reliably being forwarded to the BLE device 102F by the selected proxy device), the selected proxy device is an adversarial device (e.g., an attacker device), the BLE device 102F detects that the BLE device 102F and/or other devices of the BLE automation mesh network 101 have moved, and/or upon the occurrence of any other detectable internal or external event.

Figure 3:
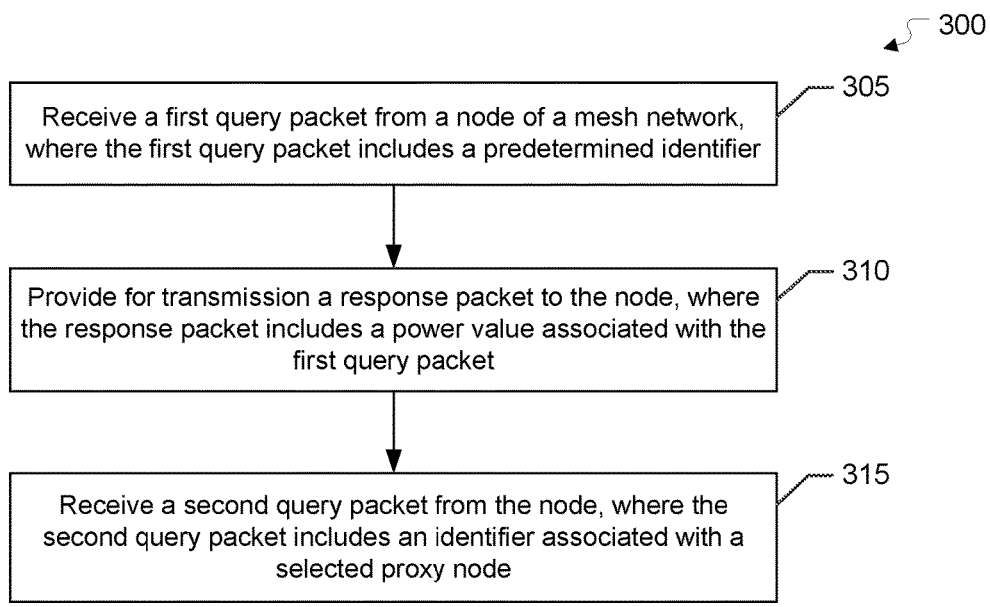

FIG. 3 illustrates a flow diagram of an example process 300 of proxy node selection in a BLE automation mesh network in accordance with one or more implementations. For explanatory purposes, the example process 300 is described herein with reference to the BLE devices 102D-F of the BLE automation mesh network 101 of FIG. 1; however, the example process 300 is not limited to the BLE devices 102D-F of the BLE automation mesh network 101 of FIG. 1. The blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed. For explanatory purposes, with reference to FIG. 3, the BLE device 102F is a low power sensor device and the BLE devices 102D and 102E may be forwarding devices or otherwise devices that are powered by larger power sources (e.g., mains power, larger batteries) and associated with higher duty cycles than the BLE device 102F.

The example process 300 may be performed by the BLE devices 102D and 102E when the example process 200 is being performed by the BLE device 102F. For explanatory purposes, the example process 300 is described as being performed by the BLE device 102D. However, the example process 300 may also be performed by the BLE device 102E.

The BLE device 102D receives a proxy query packet from the BLE device 102F (305). The proxy query packet may include a predetermined identifier in a proxy ID field of the proxy query packet, where the predetermined identifier is indicative of the BLE device 102F not yet having selected a proxy device. For example, the predetermined identifier may be 0xFF. The BLE device 102D provides for transmission a proxy response packet to the BLE device 102F (310). The BLE device 102D may measure a power present in the proxy query packet received by the BLE device 102F (e.g., measure an RSSI value) and include the measured power in the proxy response packet.

The BLE device 102D receives a proxy query packet from the BLE device 102F (315). The proxy query packet may include an identifier associated with a selected proxy device in the proxy ID field of the proxy query packet. For example, the identifier may be a node ID associated with the selected proxy device. If the identifier is associated with the BLE device 102D, the BLE device 102D may send a proxy response packet to confirm its role as a proxy device of the BLE device 102F. If the identifier is not associated with the BLE device 102D, the BLE device 102D is not the selected proxy device of the BLE device 102F. The BLE device 102D may not respond to any proxy query packets from the BLE device 102F when the proxy query packet includes an identifier in the proxy ID field that is associated with another device of the BLE automation mesh network 101 (e.g., the BLE device 102E).

In some cases, the BLE device 102D may receive multiple proxy query packets from the BLE device 102F in which the proxy ID field includes the predetermined identifier indicates that the BLE device 102F has not yet selected an associated proxy device. In such cases, the BLE device 102D transmits a proxy response packet to the BLE device 102F for each of the proxy query packets received by the BLE device 102D. The proxy response packet that is transmitted to the BLE device 102F may include a power value (e.g., RSSI value) for the corresponding proxy query packet that prompted sending of the proxy response packet.

Figure 4:
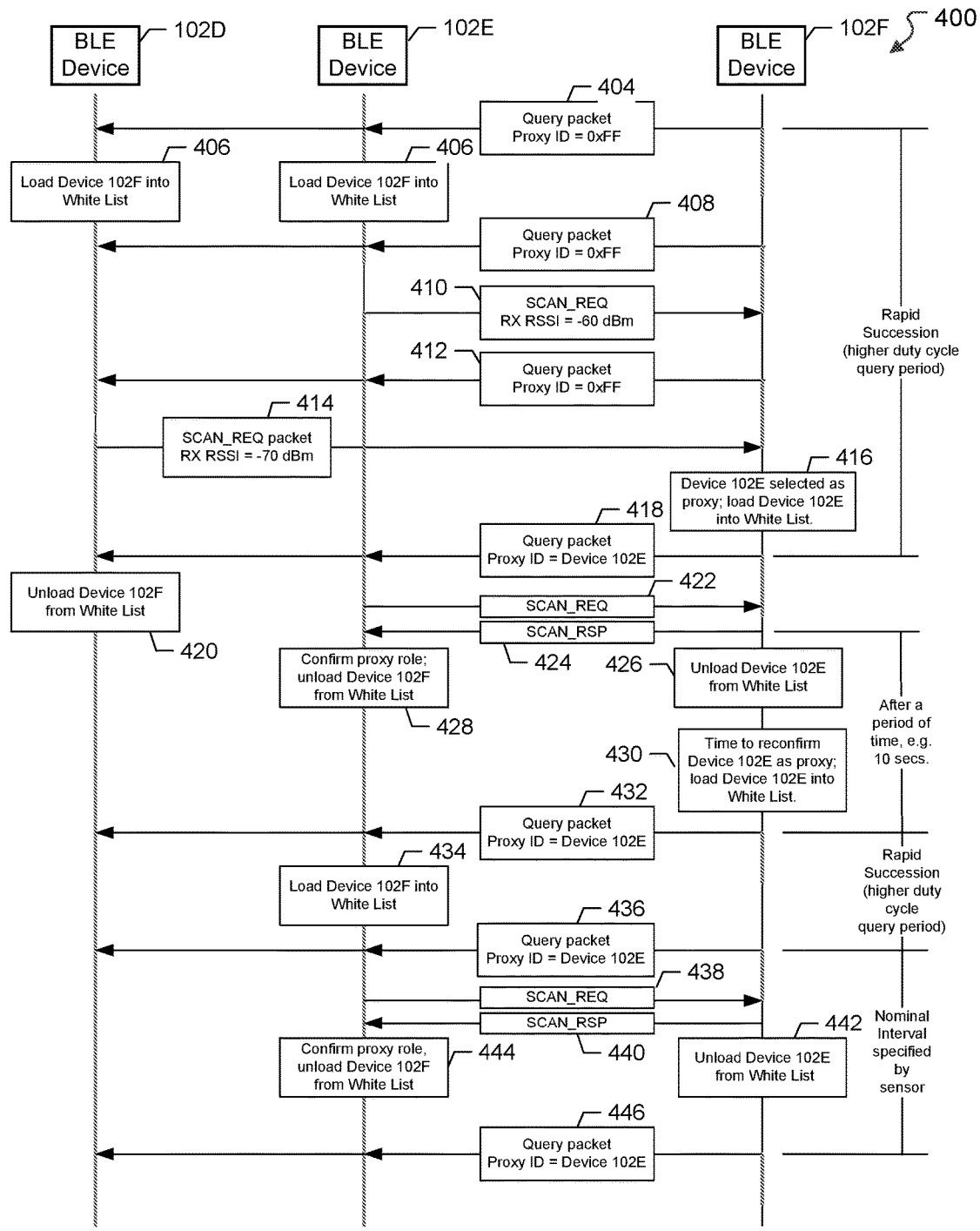

FIG. 4 illustrates a flow diagram of an example process 400 of proxy device selection in a BLE automation mesh network in accordance with one or more implementations. For explanatory purposes, the example process 400 is described herein with reference to the BLE devices 102D-F of the BLE automation mesh network 101 of FIG. 1; however, the example process 400 is not limited to the BLE devices 102D-F of the BLE automation mesh network 101 of FIG. 1. The blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed. For explanatory purposes, with reference to FIG. 4, the BLE device 102F is a low power sensor device and the BLE devices 102D and 102E may be forwarding devices or otherwise devices that are powered by larger power sources (e.g., mains power, larger batteries) and associated with higher duty cycles than the BLE device 102F. In FIG. 4, the thicker vertical lines for each device's timeline depicts when the device's radio receiver window is open and the higher duty cycle periods are identified as "Rapid Succession" in FIG. 4.

In one or more implementations, during the proxy device selection shown in the process 200, proxy query packets from the BLE device 102F include a Burst Mode Indicator bit and a Proxy Solicitation Indicator bit in the query packets. These bits may be set in a flags field of a mesh PDU that contains the proxy query packet. A Burst Mode bit that is set (e.g., set to 1) may be indicative of the BLE device 102F being in a burst mode operation. The Proxy Solicitation bit that is set (e.g., set to 1) may be indicative of the BLE device 102F being in the process of selecting its proxy device. For example, the setting of the Burst Mode Indicator bit and the Proxy Solicitation Indicator bit for proxy query packets transmitted by the BLE device 102F may cause recipient devices of the proxy query packets to load the BLE device 102F into their respective white lists. If the Proxy Solicitation Indicator bit is not set, for example, recipients of the proxy query packets from the BLE device 102F may not respond to the proxy query packets. The white list of BLE device 102D may enumerate devices that are allowed to communicate with the BLE device 102D. While a white list is in effect, transmission to the BLE device 102D by devices not in the white list may be ignored.

In one or more implementations, the various packets (e.g., proxy query packets, SCAN_REQ packets) are sent as broadcast packets on BLE advertisement channels (e.g., channels 37, 38, and 39). A BLE receiver may have 150 μs to respond to such broadcast packets. Devices of the BLE automation mesh network 101 may be set such that such response packets to the broadcast packets are sent when the received broadcast packets are from devices that are on the recipient devices' white lists. Once such exchanges are no longer needed (e.g., a proxy device has been selected), the devices may remove one another from their white lists such that no response may be needed when a broadcast packet is received. Not responding to broadcast packets may allow conservation of power and/or preservation of battery life. Thus, the loading and unloading of white lists may facilitate conservation of power and/or preservation of battery life by low power sensor devices (e.g., the BLE device 102F).

The BLE device 102F transmits a proxy query packet (404). The BLE device 102F may broadcast the proxy query packet. The proxy query packet may include a proxy ID field that is set to a predetermined value indicates that the BLE device 102F has not selected an associated proxy device. For example, the predetermined value may be 0xFF. The Burst Mode bit and the Proxy Solicitation bit may be set in the proxy query packet.

The BLE devices 102D and 102E receive the proxy query packet from the BLE device 102F. By receiving the proxy query packet, the BLE devices 102D and 102E are last hop nodes of the BLE device 102F and thus are candidates for selection as a proxy node of the BLE device 102F. On reception of the proxy query packet from the BLE device 102F, the BLE devices 102D and 102E load the BLE device 102F into their respective white lists (406). For example, the BLE devices 102D and 102E may load a BD_ADDR address associated with the BLE device 102F. The BD_ADDR is the Bluetooth device address utilized to identify a Bluetooth device.

To collect statistics associated with the BLE devices 102D and 102E, the BLE device 102F sends additional proxy query packets to each of the BLE devices 102D and 102E (408, 412). The Burst Mode bit and the Proxy Solicitation bit may be set in the proxy query packets. On reception of the additional proxy query packets from the BLE device 102F, the BLE device 102E responds with a SCAN_REQ packet (410) and the BLE device 102D responds with a SCAN_REQ packet (414). The SCAN_REQ packet from the BLE device 102E contains an RSSI value of −70 dBm. The SCAN_REQ packet from the BLE device 102D contains an RSSI value of −60 dBm. In some cases, one or more of the BLE devices 102D or 102E may not receive some or all of the proxy query packets from the BLE device 102F and/or may not be able to send SCAN_REQ packets that reach the BLE device 102F. As stipulated in the Bluetooth Low Energy standard, the BLE devices 102D and 102E transmit the SCAN_REQ packet within 150 μs of receiving the original advertisement (e.g., the proxy query packet). In some cases, rather than the SCAN_REQ packets, the BLE devices 102D and 102E may transmit other packets, such as a BLE link layer packet structure 1010 of FIG. 10 that contains the packet 1300 of FIG. 13, within 150 μs of reception of the proxy query packets.

The BLE device 102F utilizes the SCAN_REQ packets received from the BLE devices 102D and 102E to determine statistics associated with the BLE devices 102D and 102E. The statistics may include, by way of non-limiting examples, a number of received responses (e.g., SCAN_REQ packets) received from each of the BLE devices 102D and 102E, RSSI values associated with the received responses, among others. The BLE device 102F selects a proxy device based at least on the determined statistics. In some cases, the BLE device 102F may determine the statistics associated with the BLE devices 102D and 102E by measuring an RSSI value associated with SCAN_REQ packets received from the BLE devices 102D and 102E. The BLE device 102F may select as its proxy device the device associated with the highest power value (e.g., highest average RSSI value), the highest number of received responses, and/or a combination thereof.

Although FIG. 4 depicts the BLE device 102F transmitting two additional proxy query packets (408, 412) and the BLE devices 102D and 102E responding with one respective SCAN_REQ packet (410, 414), the BLE device 102F may send fewer or more than two additional proxy query packets and the BLE devices 102D and 102E may respond to more than one of the additional proxy query packets. The BLE device 102F may repeat the sending (e.g., broadcasting) of the proxy query packet multiple times and determine the statistics based on several response samples in order to select its proxy device.

The BLE device 102F selects the BLE device 102E as its proxy device and adds the BLE device 102E to a white list of the BLE device 102F (416). The white list may be loaded with a BD_ADDR associated with the BLE device 102E. To confirm the proxy node selection, the BLE device 102F transmits (e.g., broadcasts) a proxy query packet to the BLE device 102E, and the BLE device 102F, with the proxy ID field set to the node ID associated with the BLE device 102E (418). The Burst Mode bit and the Proxy Solicitation bit may be set in the proxy query packet.

Since the BLE device 102D is not selected as the associated proxy device of the BLE device 102F and the BLE device 102E is selected as the associated proxy device of the BLE device 102F, on reception of the proxy query packet by the BLE device 102D and the BLE device 102E, the BLE device 102D unloads the BLE device 102F from the white list of the BLE device 102D (420) and the BLE device 102E responds with a SCAN_REQ packet (422). The SCAN_REQ packet may be utilized to confirm a mutual agreement between the BLE device 102E and the BLE device 102F that the BLE device 102F may utilize the BLE device 102E as its proxy device. On reception of the SCAN_REQ packet, the BLE device 102F responds with a SCAN_RSP packet to confirm the association between the BLE device 102E and the BLE device 102F (424). As stipulated in the Bluetooth Low Energy standard, the BLE device 102F transmits the SCAN_RSP packet within 150 is of receiving the SCAN_REQ packet. The SCAN_RSP may be issued 150 µs upon receipt of a last bit of the SCAN_REQ packet. The SCAN_REQ and SCAN_RSP packets may indicate of a successful handshake between the BLE device 102E and the BLE device 102F. The BLE device 102F unloads the BLE device 102E from the white list of the BLE device 102F (426). The BLE device 102E unloads the BLE device 102F from the white list of the BLE device 102E (428).

The BLE devices 102E and 102F may then utilize their normal forwarding procedures. For example, during normal forwarding procedures, the BLE device 102E may not respond to query packets from the BLE device 102F. These query packets may include the packet 1200 of FIG. 12 with the Burst Mode Indicator set and the Proxy Solicitation Indicator not set. Not responding to the query packets may allow conservation of power and/or preservation of battery life of the BLE device 102F, since the BLE device 102F does not have to process a response from the BLE device 102E.

The BLE device 102F reconfirms its forwarding proxy relationship with the BLE device 102E by loading the BLE device 102E into the white list of the BLE device 102F (430) and transmitting (e.g., broadcasting) a proxy query packet that contains a proxy ID field with the BLE device 102E identified as its proxy device (432). The Burst Mode Indicator bit and the Proxy Solicitation Indicator bit may be set in the proxy query packet. The reconfirmation may occur periodically, such as every ten seconds, and/or whenever device movement is suspected and/or mesh network proximity reentry is detected.

On reception of the proxy query packet, the BLE device 102E loads the BLE device 102F into the white list of the BLE device 102E (434). The BLE device 102F transmits an additional proxy query packet to the BLE device 102E (436). On reception of the additional proxy query packet, the BLE device 102E responds with an SCAN_REQ packet (438). On reception of the SCAN_REQ packet, the BLE device 102F responds with a SCAN_RSP packet to reconfirm the proxy relationship (440). The BLE device 102F unloads the BLE device 102E from the white list of the BLE device 102F (442). The BLE device 102E unloads the BLE device 102F from the white list of the BLE device 102E (444).

The BLE devices 102E and 102F may then continue to utilize normal forwarding procedures. During the normal forwarding procedures, the BLE device 102F transmits a query packet (446). The query packet may have the proxy ID field set to the BLE device 102E, the Burst Mode Indicator bit set (e.g., set to 1), and the Proxy Solicitation Indicator bit not set. The query packet may be utilized by the BLE device 102F as an advertisement to query for any packets (e.g., potentially queued in the BLE device 102E) that are to be forwarded to (e.g., addressed to) the BLE device 102F, as will be discussed further below with respect to, for example, FIG. 7. BLE devices that are not selected as the associated proxy device of the BLE device 102F may not take any action (e.g., not forward) on packets addressed to the BLE device 102F that are received by the non-selected BLE devices.

Last hop devices that are not selected as the proxy device may unload the BLE device 102F from their white lists upon receiving a proxy query packet from the BLE device 102F with the proxy ID set to a value that is not the last hop devices' node ID and with the Proxy Solicitation Indicator bit set to indicate that the BLE device 102F is no longer soliciting a proxy device. In some cases, the unselected last hop devices may reply with a SCAN_REQ packet. The BLE device 102F may identify that the SCAN_REQ packets are from unselected last hop devices based on a comparison of the BD_ADDR of the selected last hop device with the BD_ADDR of the unselected last hop devices.

Figure 5:
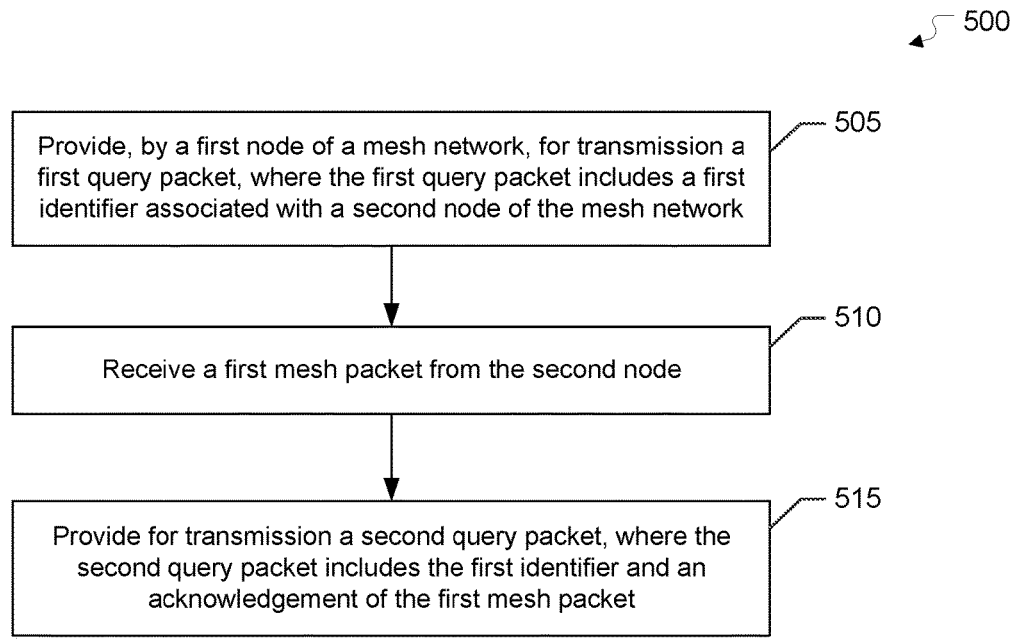
FIGS. 5 through 9 illustrate flow diagrams of example processes of forwarding of mesh packets in a BLE automation mesh network in accordance with one or more implementations.

FIG. 5 illustrates a flow diagram of an example process 500 of forwarding of mesh packets in a BLE automation mesh network in accordance with one or more implementations. For explanatory purposes, the example process 500 are described herein with reference to the BLE devices 102E-F of the BLE automation mesh network 101 of FIG. 1; however, the example process 500 is not limited to the BLE devices 102E-F of the BLE automation mesh network 101 of FIG. 1. The blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed. The mesh packets may have the format of a BLE link layer packet structure 1010, which is discussed further below with respect to FIG. 10.

For explanatory purposes, with reference to FIG. 5, the BLE device 102F is a low power sensor device and the BLE devices 102D and 102E may be forwarding devices or otherwise devices that are powered by larger power sources (e.g., mains power, larger batteries) and associated with higher receive duty cycles than the BLE device 102F. The BLE device 102F has previously selected the BLE device 102E as its proxy device. For example, the BLE device 102F may have selected the BLE device 102E as its proxy device by performing the process 200 of FIG. 2.

The BLE device 102F transmits a query packet (505). For example, the BLE device 102F may broadcast the query packet. The Burst Mode bit may be set in the query packet. The query packet may include an identifier associated with the BLE device 102E in a proxy ID field, indicating that the BLE device 102E has been selected as a proxy device of the BLE device 102F. Since its proxy device has been selected, the BLE device 102F does not set the Proxy Solicitation bit in the query packet. The query packet may be utilized by the BLE device 102F to request that the BLE device 102E forward any mesh packets addressed to the BLE device 102F that the BLE device 102E has received and cached on behalf of the BLE device 102F. The BLE device 102F may transmit a query packet at a rate based on a power profile and/or a message reactivity latency of the BLE device 102F.

The BLE device 102F receives a mesh packet from the BLE device 102E (510). The BLE device 102F transmits (e.g., broadcasts) a query packet in response to receiving the mesh packet (515). The query packet may include an identifier associated with the BLE device 102E in a proxy ID field and an acknowledgement that the BLE device 102F has successfully received and authenticated the mesh packet. The acknowledgement may be provided by an Acknowledgement Indicator bit in a flags field of a mesh PDU that contains the query packet. For example, when the Acknowledgement bit is set (e.g., set to 1), the BLE device 102F is indicating that the mesh packet has been successfully received and authenticated. When the Acknowledgement Indicator bit is not set, the BLE device 102F is indicating that the mesh packet has not been received and/or has not been authenticated successfully.

Figure 6:
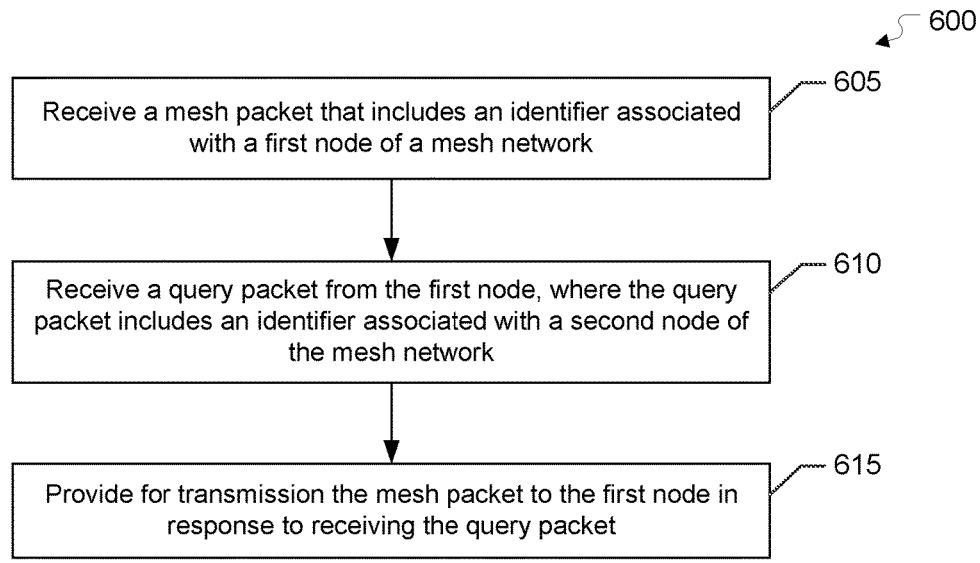

FIG. 6 illustrates a flow diagram of an example process 600 of forwarding of mesh packets in a BLE automation mesh network in accordance with one or more implementations. For explanatory purposes, the example process 600 is described herein with reference to the BLE devices 102E-F of the BLE automation mesh network 101 of FIG. 1; however, the example process 600 is not limited to the BLE devices 102E-F of the BLE automation mesh network 101 of FIG. 1. The blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed.

For explanatory purposes, with reference to FIG. 6, the BLE device 102F is a low power sensor device and the BLE devices 102D and 102E may be forwarding devices or otherwise devices that are powered by larger power sources (e.g., mains power, larger batteries) and associated with higher receiver duty cycles than the BLE device 102F. The BLE device 102F has previously selected the device 102E as its proxy device. For example, the BLE device 102F may have selected the BLE device 102E as its proxy device by performing the process 200 of FIG. 2.

The BLE device 102E receives a mesh packet addressed to the BLE device 102F (605). The BLE device 102E receives a query packet from the BLE device 102F, where the query packet includes the identifier associated with the BLE device 102E in the proxy ID field (610). The Burst Mode bit may be set in the query packet. The Proxy Solicitation bit may not be set in the query packet. The BLE device 102E transmits the mesh packet to the BLE device 102F in response to receiving the query packet (615). The BLE device 102E may store the mesh packet in a buffer of the BLE device 102E until the BLE device 102E receives an acknowledgement from the BLE device 102F that the mesh packet has successfully received and authenticated the mesh packet.

Figure 7:
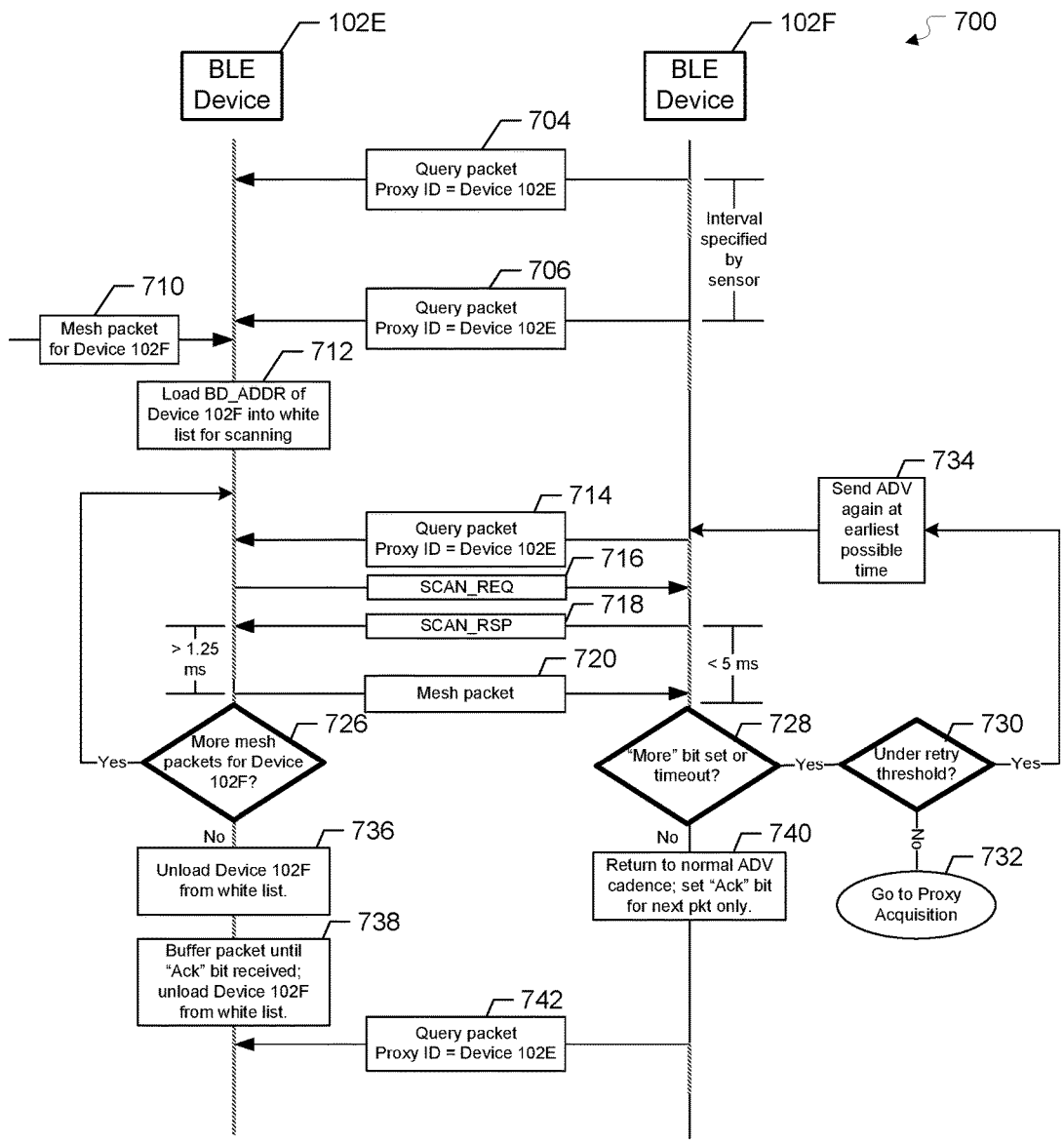

FIG. 7 illustrates a flow diagram of an example process 700 of forwarding of mesh packets in a BLE automation mesh network in accordance with one or more implementations. For explanatory purposes, the example process 700 is described herein with reference to the BLE devices 102E-F of the BLE automation mesh network 101 of FIG. 1; however, the example process 700 is not limited to the BLE devices 102E-F of the BLE automation mesh network 101 of FIG. 1. The blocks of example process 700 are described herein as occurring in serial, or linearly. However, multiple blocks of example process 700 may occur in parallel. In addition, the blocks of example process 700 need not be performed in the order shown and/or one or more of the blocks of example process 700 need not be performed. In FIG. 7, the thicker vertical lines for each device's timeline depicts when the device's radio receiver window is open.

For explanatory purposes, with reference to FIG. 7, the BLE device 102F is a low power sensor device and the BLE devices 102D and 102E may be forwarding devices or otherwise devices that are powered by larger power sources (e.g., mains power, larger batteries) and associated with higher receive duty cycles than the BLE device 102F. The BLE device 102F has previously selected the BLE device 102E as its proxy device. For example, the BLE device 102F may have selected the BLE device 102E as its proxy device by performing the process 200 of FIG. 2.

With reference to FIG. 7, the BLE device 102F transmits query packets with a proxy ID field set to the BLE device 102E (704, 706), which is the selected proxy device. The Burst Mode bit may be set in the query packets. The Proxy Solicitation bit may not be set in the query packets. The query packets may be broadcasted at a rate that may be based on a power profile and/or a message reactivity latency of the BLE device 102F.

The BLE device 102E receives one or multiple mesh packets addressed to the BLE device 102F (710). The mesh packets may have the format of the BLE link layer packet structure 1010 of FIG. 10. A payload of the mesh packets may include one of the BLE automation mesh packet types shown in Table 1, which is discussed below with respect to FIG. 10. With reference to FIG. 1, the mesh packet may have originated from (e.g., been generated by) the BLE device 102B and may be addressed at least to the BLE device 102F. The mesh packet may have followed a path to the BLE device 102E by first being received by the BLE device 102A from the BLE device 102B and then received by the BLE device 102E from the BLE device 102A. Although the BLE device 102D may also receive the mesh packet from the BLE device 102A, the BLE device 102D is not the proxy device of the BLE device 102F and therefore does not forward the mesh packet to the BLE device 102F.

On reception of the mesh packet, the BLE device 102E loads the BLE device 102F into the white list of the BLE device 102E (712). The BLE device 102E may load the BLE device 102F into the white list of the BLE device 102E when the BLE device 102E has previously received a query packet from the BLE device 102F with the BLE device 102E identified as an associated proxy device and the BLE device 102E subsequently receives and queues a mesh packet to be forwarded to the BLE device 102F. For example, the BLE device 102E may load a BD_ADDR of the BLE device 102F into the white list of the BLE device 102E for scanning. With the BLE device 102F loaded into the white list of the BLE device 102E, the BLE device 102E may respond to connectable/scannable advertisements from the BLE device 102F with SCAN_REQ packets. In some cases, the BLE device 102E determines whether the BLE device 102E has received multiple mesh packets. If the BLE device 102E has received multiple mesh packets, the BLE device 102E may buffer the mesh packets and provide the mesh packets for transmission in a first-in-first-out (FIFO) order.

The BLE device 102F provides for transmission a query packet with a proxy ID field set to the BLE device 102E (714). The Burst Mode bit may be set in the query packets. On reception of the query packet, the BLE device 102E sends a SCAN_REQ packet (716). On receipt of the SCAN_REQ packet, the BLE device 102F responds with a SCAN_RSP packet (718). On transmission completion of the SCAN_RSP packet, the BLE device 102F opens its receiver window for a predetermined amount of time. The receiver window of the BLE device 102F may be opened upon transmission completion of a last bit of the SCAN_RSP packet. In some cases, the receiver window may be opened for a maximum of 5 ms.

On completion of reception of the SCAN_RSP packet (e.g., the last bit of the SCAN_RSP packet), the BLE device 102E waits for a predetermined duration of time (e.g., at least 1.25 ms) and then forwards a pending mesh packet to the BLE device 102F (720). In one or more implementations, since the address of the BLE device 102F has been loaded into the white list of the BLE device 102E, the reception of the SCAN_RSP packet may trigger an automatic transmission of the mesh packet to the BLE device 102F, with or without waiting for the predetermined duration of time. If more than one mesh packet is pending transmission, the BLE device 102E forwards the mesh packets one by one. The mesh packets may be forwarded in a FIFO order. In some cases, the BLE device 102E may set a More Indicator bit in a flags field of the mesh packets to a value that indicates to the BLE device 102F that additional mesh packets will be sent subsequent to a mesh packet currently being received by the BLE device 102F (728). The BLE device 102E does not set the More Indicator bit for the last pending mesh packet to be forwarded to the BLE device 102F. In some cases, when the BLE device 102F receives a forwarded mesh packet with a More Indicator bit set and/or if the BLE device 102F does not receive a mesh packet within the predetermined time (e.g., 5 ms) of transmitting the SCAN_RSP packet, the BLE device 102F may have an option to repeat the procedure in rapid succession.

The BLE device 102E may buffer the forwarded mesh packet and continue to retransmit the buffered mesh packet until an acknowledgement is received from the BLE device 102F. The BLE device 102E may not transmit other mesh packets in its queue until the most recently transmitted mesh packet has been acknowledged by the BLE device 102F. The acknowledgement may be utilized by the BLE device 102F to indicate that the BLE device 102F has successfully received and authenticated the forwarded mesh packet. The BLE device 102F may acknowledge the forwarded mesh packet by sending a query packet within a mesh PDU that has an Acknowledgement Indicator bit set. In some cases, the BLE device 102F may maintain the state of the Acknowledgement Indicator bit in its query packets and only toggle the Acknowledgement Indicator bit when acknowledging a next forwarded mesh packet. The maintaining the state of the Acknowledgement Indicator bit may allow robustness against lost query packets at the BLE device 102E.

The BLE device 102E determines whether there are more mesh packets addressed to the BLE device 102F (726). Blocks 714, 716, 718, and 720 may be repeated until the BLE device 102E determines that it does not have any more mesh packets to forward to the BLE device 102F. When the BLE device 102E does not have any more mesh packets to forward to the BLE device 102F, the BLE device 102E unloads the BLE device 102F from the white list of the BLE device 102E (736). The BLE device 102E buffers the last mesh packet that is forwarded to the BLE device 102F until the BLE device 102E receives an acknowledgement from the BLE device 102F (738). The acknowledgement may be a query packet within a mesh PDU that has an Acknowledgement Indicator bit set received from the BLE device 102F.

The BLE device 102F determines whether a number of non-successful attempts to receive and/or authenticate a mesh packet exceed a predetermined threshold (730). For example, the predetermined threshold may be five non-successful attempts. If the number of non-successful attempts exceeds the predetermined threshold, the BLE device 102F may terminate the forwarding procedure and regard the relationship between itself and the device 102E as non-effective. The BLE device 102F may re-execute proxy acquisition to select a proxy device (732) (e.g., by performing the example process 200 of FIG. 2). If the number of non-successful attempts has not exceeded the predetermined threshold, the BLE device 102F sends an advertisement packet at an earliest possible time (734). In one or more implementations, the advertisement packet may be the same as the query packet sent at block 714. Alternatively or in addition, a predetermined threshold based on a ratio of number of non-successful attempts to a number of successful attempts may be utilized.

Once the forwarding procedure is complete (e.g., a forwarded mesh packet is received by the BLE device 102F without the More Indicator bit set in the flags field), the BLE device 102F reverts back to its normal period for issuing of the query packet (740, 742). For example, prior to reverting back to the normal period, the BLE device 102F may transmit (e.g., broadcast) a query packet once every 20 to 100 ms. During the normal period, the BLE device 102F may transmit a query packet once, for example, every 5 to 10 seconds or 5 to 10 minutes, among other possible time intervals.

Figure 8:
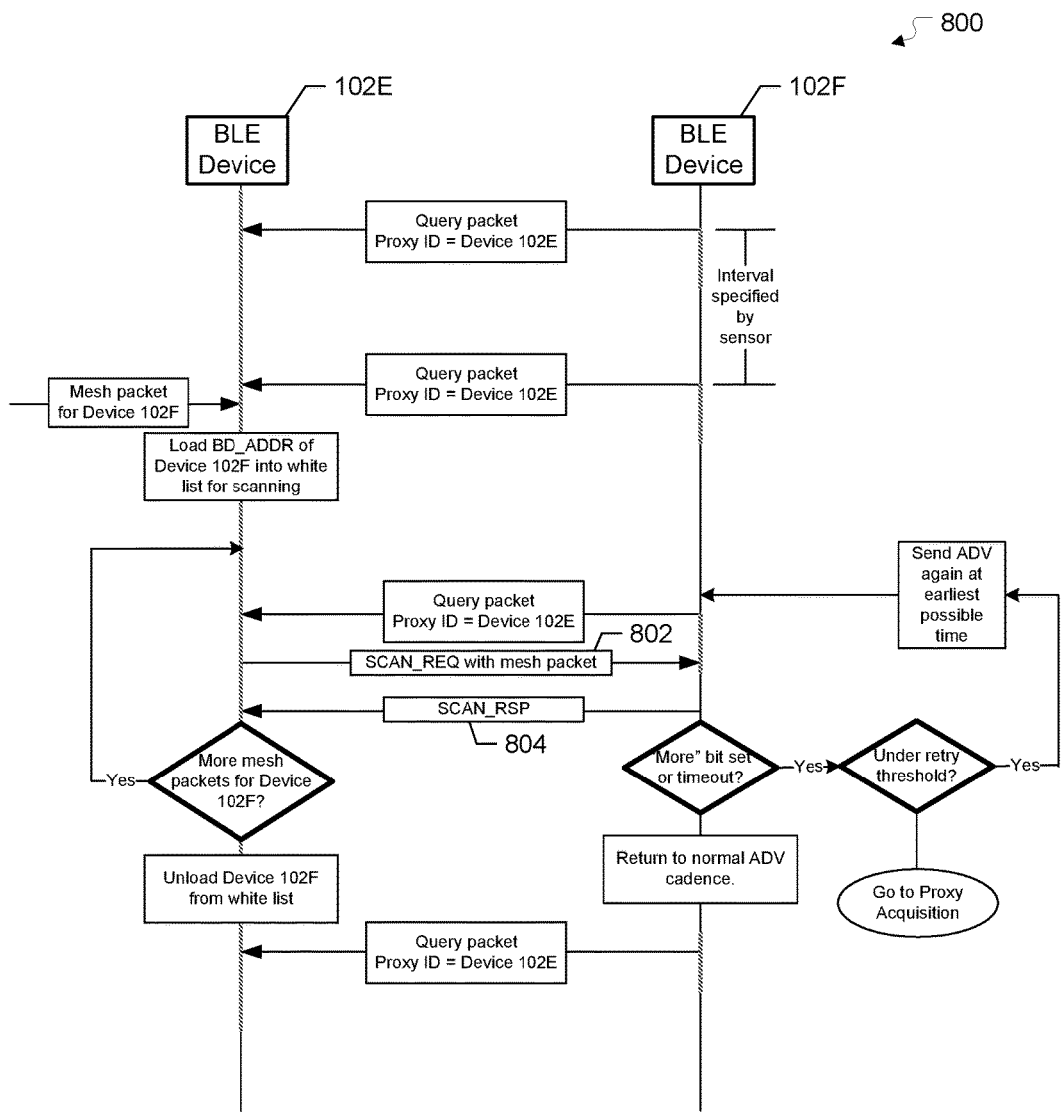

FIG. 8 illustrates a flow diagram of an example process 800 of forwarding of mesh packets in a BLE automation mesh network 101 in accordance with one or more implementations. For explanatory purposes, the example process 800 is described herein with reference to the BLE devices 102E-F of the example network environment 100 of FIG. 1; however, the example process 800 is not limited to the BLE devices 102E-F of the BLE automation mesh network 101 of FIG. 1. The blocks of example process 800 are described herein as occurring in serial, or linearly. However, multiple blocks of example process 800 may occur in parallel. In addition, the blocks of example process 800 need not be performed in the order shown and/or one or more of the blocks of example process 800 need not be performed. In FIG. 8, the thicker vertical lines for each device's timeline depicts when the device's radio receiver window is open.

For explanatory purposes, with reference to FIG. 8, the BLE device 102F is a low power sensor node and the BLE devices 102D and 102E may be forwarding devices or otherwise devices that are powered by larger power sources (e.g., mains power, larger batteries) and associated with higher receive duty cycles than the BLE device 102F. The BLE device 102E has previously selected the BLE device 102F as its proxy device. For example, the BLE device 102F may have selected the BLE device 102E as its proxy device by performing the process 200 of FIG. 2.

The description from FIG. 7 generally applies to FIG. 8, with examples of differences between FIG. 7 and FIG. 8 and other description provided herein for purposes of clarity and simplicity. The BLE device 102E provides for transmission a SCAN_REQ packet that includes the mesh packet (802). On receipt of the SCAN_REQ packet, the BLE device 102F provides for transmission a SCAN_RSP packet (804). The BLE device 102E may regard the SCAN_RSP packet as an acknowledgement of the BLE device 102F having successfully received and authenticated the SCAN_REQ packet and the mesh packet included in the SCAN_REQ packet. The BLE device 102E may buffer the mesh packet until the BLE device 102E receives the SCAN_RSP packet from the BLE device 102F. When the BLE device 102E has multiple pending mesh packets to send to the BLE device 102F, the BLE device 102E may include each of the mesh packets in a respective SCAN_REQ packet. The BLE device 102E may set a More Indicator bit in the mesh packets to indicate that the BLE device 102E has additional mesh packets to send to the BLE device 102F.

Figure 9:
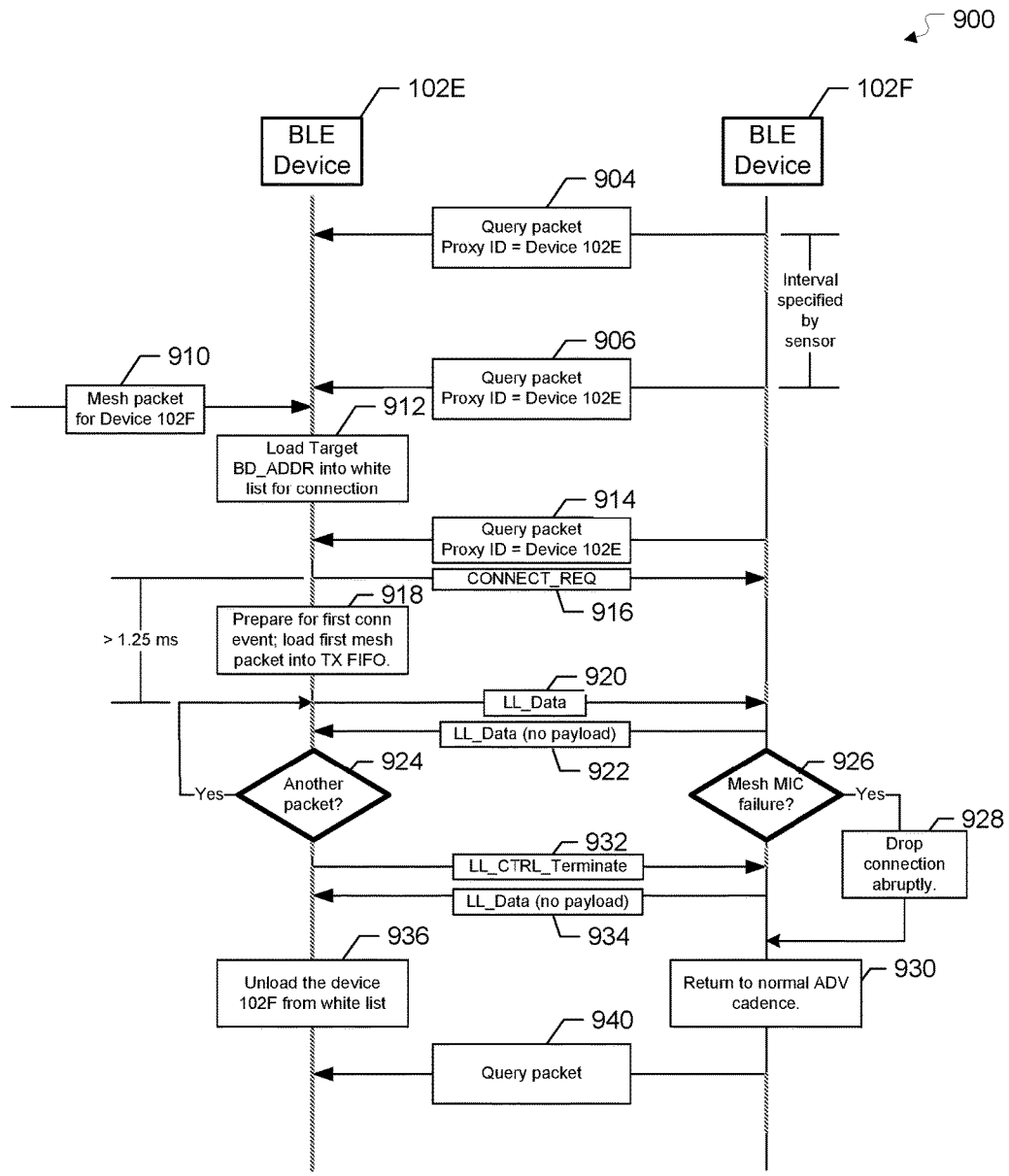

FIG. 9 illustrates a flow diagram of an example process 900 of forwarding of mesh packets in a BLE automation mesh network 101 in accordance with one or more implementations. For explanatory purposes, the example process 900 is described herein with reference to the BLE devices 102E-F of the BLE automation mesh network 101 of FIG. 1; however, the example process 900 is not limited to the BLE devices 102E-F of the BLE automation mesh network 101 of FIG. 1. The blocks of example process 900 are described herein as occurring in serial, or linearly. However, multiple blocks of example process 900 may occur in parallel. In addition, the blocks of example process 900 need not be performed in the order shown and/or one or more of the blocks of example process 900 need not be performed. In FIG. 9, the thicker vertical lines for each device's timeline depicts when the device's radio receiver window is open.

For explanatory purposes, with reference to FIG. 9, the BLE device 102F is a low power sensor node and the BLE devices 102D and 102E may be forwarding devices or otherwise devices that are powered by larger power sources (e.g., mains power, larger batteries) and associated with higher receive duty cycles than the BLE device 102F. The BLE device 102F has previously selected the BLE device 102E as its proxy device. For example, the BLE device 102F may have selected the BLE device 102E as its proxy device by performing the process 200 of FIG. 2.

The process 900 may be utilized to allow connection-oriented transmission of mesh packets. The connection may be a BLE connection. The BLE device 102F provides for transmission query packets with a proxy ID field set to the BLE device 102E (904, 906), which is the selected proxy node. The query packets may be broadcasted at a rate that may be based on a power profile and/or a message reactivity latency of the BLE device 102F. The Burst Mode bit may be set in the query packet.

The BLE device 102E receives one or multiple mesh packets addressed to the BLE device 102F (910). On reception of the mesh packet, the BLE device 102E loads the BLE device 102F into the white list of the BLE device 102E (912). For example, the BLE device 102E may load a BD_ADDR of the BLE device 102F into the white list of the BLE device 102E to allow initiation of a BLE connection with the BLE device 102F. The BLE device 102F provides for transmission a query packet with a proxy ID field set to the BLE device 102E (914). The Burst Mode bit may be set in the query packet. On reception of the query packet, the BLE device 102E sends a CONNECT_REQ packet to the BLE device 102F and subsequently enters a BLE connection with the BLE device 102F (916). The CONNECT_REQ packet may include an identifier (e.g., an address) associated with the BLE device 102E (e.g., the initiator node) and an identifier (e.g., an address) associated with the BLE device 102F. The BLE device 102F may receive the CONNECT_REQ packet and, in response to the reception, transition to the connection state with the BLE device 102E. The connection interval, which provides a start time between temporally adjacent connection events, may be 7.5 ms.

Once in the BLE connection, the device prepares for a connection event and loads a mesh packet (e.g., in FIFO order) for transmission (918). The BLE device 102E transmits a link layer data (LL_Data) packet (920). The LL_Data packet may include one or multiple mesh packets as part of a payload of the LL_Data packet. On receipt of the LL_Data packet from the BLE device 102E, the BLE device 102F transmits an LL_Data packet to the BLE device 102E (922). The LL_Data packet may not include a payload. The BLE device 102F may utilize the LL_Data packet to acknowledge reception of the mesh packets using BLE connection link layer procedures. For example, a link layer acknowledgement in the LL_Data packet may be utilized to acknowledge reception of the mesh packet. In such cases, the Acknowledgement bit need not be set in the mesh packets.

The BLE device 102E determines whether the BLE device 102E has additional mesh packets to transmit to the BLE device 102F (924). The BLE device 102E provides for transmission LL_Data packets that include mesh packets and the BLE device 102F responds with LL_Data packets as acknowledgement. In one or more implementations, the connection is sustained until all data (e.g., all mesh packets) have been forwarded by the BLE device 102E to the BLE device 102F. In such cases, the More Indicator bit no longer needs to be set in the mesh packets to indicate to the BLE device 102F that the BLE device 102E has additional mesh packets to forward to the BLE device 102F.

For each mesh packet received, the BLE device 102F determines whether the mesh packet is authenticated successfully (926). The BLE device 102F may utilize a message integrity check (MIC) field associated with the mesh packets for authentication. If a mesh packet received by the BLE device 102F does not authenticate, the BLE device 102F may close the BLE connection (928). In some cases, the BLE device 102F may immediately and silently close the BLE connection. If the BLE device 102F closes the BLE connection or the BLE connection drops, the BLE device 102F may re-execute proxy device acquisition, such as the process 200 of FIG. 2. In some cases, upon the BLE device 102F closing the BLE connection or the BLE connection dropping, the BLE device 102F reverts back to its normal periodic issuing of query packets (930, 940). In such cases, the query packets may include an identifier indicating that the BLE device 102F has not yet selected a proxy device. The Burst Mode Indicator bit may be set in the query packets.

Once all mesh packets have been forwarded, the BLE device 102E sends an LL_CTRL_Terminate PDU to the BLE device 102F to dismantle the BLE connection (932). On reception of the LL_CTRL_Terminate PDU, the BLE device 102F provides for transmission an LL_Data packet to the BLE device 102E (934). The LL_Data packet may not include a payload. The LL_Data packet may include a link layer acknowledgement that acknowledges reception of the LL_CTRL_Terminate PDU. The BLE device 102E unloads the BLE device 102F from the white list of the BLE device 102E (936). The BLE device 102F reverts back to its normal periodic issuing of query packets (930, 940). The query packets may include an identifier indicating that the BLE device 102E is the proxy device of the BLE device 102F. The Burst Mode Indicator bit may be set in the query packets.

Relative to broadcast approaches, the connection-oriented approach may utilize additional management and resource overhead associated with establishing a BLE connection. The connection-oriented approach may allow utilization of mechanisms native to BLE connections for message forwarding and acknowledgement. The connection-oriented approach may allow forwarding and acknowledging of packets without setting More and/or Acknowledgement Indicator bits in the mesh packets. While several added link management exchanges may be utilized when compared to broadcast approaches, the exchanges may be timed such that the BLE device 102F may optimize power expended during the exchanges.

In one or more implementations, the BLE automation mesh network 101 may utilize broadcast advertising channels for communications through the BLE automation mesh network 101. BLE non-connectable and connectable packets may be used for the BLE automation mesh packets.

Figure 10:
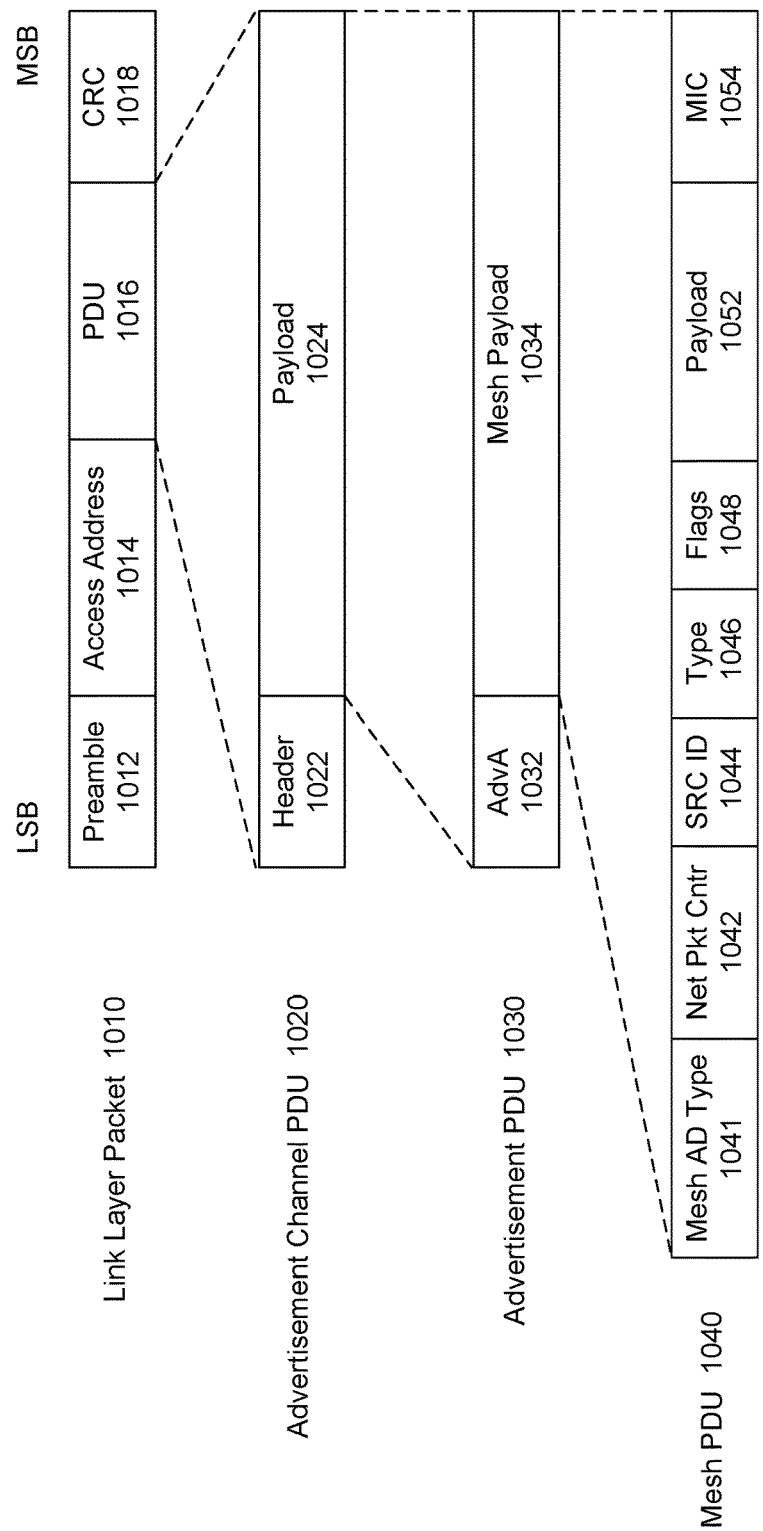
FIG. 10 illustrates an example of a BLE link layer packet structure that carries a BLE automation mesh protocol data unit structure in accordance with one or more implementations.

FIG. 10 illustrates an example of a BLE link layer packet 1010 that carries a BLE automation mesh PDU 1040 in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided. When a packet is transmitted through the BLE automation mesh network 101 from any one device, the BLE link layer packet structure 1010 depicted in FIG. 10 may be used. The mesh packet illustrated in the foregoing figures, such as in FIG. 7, may have the BLE link layer packet structure 1010. The query packet illustrated in the foregoing figures, such as in FIG. 7, may be a part of the BLE link layer packet 1010.

The BLE link layer packet structure 1010 may include a preamble field 1012, an access address field 1014, a PDU field 1016, and a cyclic redundancy check (CRC) field 1018. The PDU field 1016 carried in the BLE link layer packet structure 1010 may be or may include an advertisement channel PDU structure 1020. In one or more implementations, the preamble field 1012 is 1 byte, the access address field 1014 is 4 bytes, and the CRC field 1018 is 3 bytes.

The advertisement channel PDU structure 1020 may include a header field 1022 and a payload field 1024. The payload field 1024 may be or may include an advertisement PDU structure 1030, such as a non-connectable advertisement PDU structure or a connectable advertisement PDU structure. The advertisement PDU structure 1030 may include an advertiser's address field 1032, denoted as AdvA, and a mesh payload field 1034. The header field 1022 of the advertisement channel PDU structure 1020 may include a type field (not shown) that indicates whether the payload field 1024 is a non-connectable advertisement PDU structure or a connectable advertisement PDU structure. The mesh payload field 1034 may be or may include a mesh PDU structure 1040, such as a BLE automation mesh PDU structure.

The mesh PDU structure 1040 may include a mesh advertising data (AD) type header 1041, a network packet counter field 1042, denoted as Net Pkt Cntr; a source ID field 1044, denoted as SRC ID; a type field 1046; a flags field 1048; a payload field 1052, and a MIC field 1054. The mesh AD type header 1041 will be discussed with reference to FIG. 11. In one or more implementations, the network packet counter field 1042 is utilized as part of a nonce for an encryption and message authentication process, such as an AES-CCM (Advanced Encryption Standard Counter with Cipher Block Chaining Message Authentication Code) encryption and message authentication process. The network packet counter field 1042 may be utilized as a message ID to prevent an endless (e.g., infinite) loop forwarding by devices within the BLE automation mesh network 101 that are utilized for forwarding functionality. The network packet counter field 1042 may be 5 bytes.

In one or more implementations, the mesh AD type header 1041 and the network packet counter field 1042 are the only fields in the mesh PDU structure 1040 that is carried in clear text (e.g., without encryption). In such cases, the other fields and user payload contents are encrypted and authenticated. The mesh devices in route to a destination mesh device should decrypt the content and authenticate the content prior to forwarding or consuming the content.

The network packet counter field 1042 may include five octet values. The values may be utilized to encrypt and authenticate packet content. The other fields of the mesh PDU structure 1040 may be encrypted and authenticated using the exchanged mesh network key as a CCM nonce. In one or more implementations, the CCM nonce is constructed in part by the network packet counter value and an exchanged initialization vector.

To facilitate thwarting of an attack (e.g., a brute force correlation attack) on the mesh network key, a unique network packet counter may be used when ciphering any single data packet that crosses the BLE automation mesh network 101 regardless of which device originates the data. In one or more implementations, the network packet counter field 1042 contains a 5 byte unsigned value that is segmented across 512 packet counter distributions. When entering the BLE automation mesh network 101, each device is provided with one of the packet counter distributions. By providing each device with one of the packet counter distributions, each device can cipher more than 2.1 billion individual transmissions during a life of the mesh network key, ensuring a freshness of the nonce used in the cipher procedure across the devices for the life of the product.

The source ID field 1044 contains the node ID of the originator of the message. The source ID field 1044 may be 1 byte. The type field 1046 identifies which packet type is being carried in the payload field 1052. The type field may be 1 byte. Table 1 shows examples of BLE automation mesh packet types that may be supported in the BLE automation mesh network 101, in accordance with one or more implementations. Types 0x01 through 0x07 in Table 1 will be described in more detail later in the present disclosure.

TABLE 1

BLE automation mesh packet types

| Type | Description |
|---|---|
| 0x00 | Raw Network Packet |
| 0x01 | Query Packet |
| 0x02 | Query-Response Packet |
| 0x03 | Point-to-Point Secure Packet |
| 0x04 | Point-to-Multipoint Packet |
| 0x05 | Point-to-Multi-Actuator Packet |
| 0x06 | Point-to-Point Secure Acknowledgement Packet |
| 0x07 | Point-to-Point Acknowledgement Packet |
| 0x08-0xFF | Reserved |

The flags field 1048 may provide information associated with attributes and processing aspects, and the flags field may be, for example, 1 byte (e.g., $b_7b_6b_5b_4b_3b_2b_1b_0$). Table 2 provides examples of flags that may be supported for a BLE automation mesh payload in the BLE automation mesh network 101, in accordance with one or more implementations. Each flag may be associated with a bit in the flags field 1048. A flag that is set to 1 may be referred to as a set flag. A flag that is set to 0 may be referred to as not set.

TABLE 2

BLE automation mesh payload flags field

| Flags | Description |
|---|---|
| Burst mode indicator ($b_0$) | When set to 1, this flag indicates that the burst mode is being used. When set to 0, the burst mode is not used. This bit may also be referred to as a low power sensor bit. |
| Local visibility indicator ($b_1$) | When set to 1, this flag indicates that a requestor device is looking for first hop visibility of a recipient device. When set to 0, the requestor device is looking for all accumulated visibility of the recipient device. |
| Acknowledgement request indicator ($b_2$) | When set to 1, this flag indicates that the SRC ID node is looking for an acknowledgement from the DST ID node. The DST ID node may be a node ID or a group node ID. |
| More indicator ($b_3$) | When set to 1, this flag indicates that more data (e.g., more mesh packets) are pending. This bit may be set in burst mode operation where a last hop forwarding device (e.g., a proxy device) indicates to another device (e.g., a low power sensor device) that there are more packets to be forwarded. |
| Acknowledgement indicator ($b_4$) | When set to 1, this flag indicates that a last packet was received and authenticated successfully. When set to 0, this flag indicates a last packet is not acknowledged (NAK). This bit may be set in burst mode operation where a device (e.g., a low power sensor device) indicates to a last hop forwarding device (e.g., a proxy device) that a previous packet forwarded by the last hop forwarding device was received and authenticated successfully. Once the packet is acknowledged, the last hop forwarding device may flush the packet from its buffer(s). |
| Proxy solicitation indicator ($b_5$) | When set to 1, this flag indicates that an originator of a packet with this flag set to 1 is in progress of selecting a proxy device. When set to 0, this flag indicates that an originator of a packet with this flag set to 0 does not need a proxy device or has already selected a proxy device. This bit may be set in burst mode operation when a device (e.g., a low power sensor device) is looking for a proxy device candidate. |
| Reserved ($b_7$, $b_6$) | All other bits are reserved. |

The length of the various fields shown in FIG. 10 may vary depending on the packet structure that is used. The length of the control fields, such as the preamble field 1012, access address field 1014, header field 1022, and advertiser's address field 1032, is dependent on the packet structure that is used. A maximum length of the PDU or payload, such as PDU field 1016 and payload fields 1024, 1034, and 1052, is dependent on the packet structure that is used. Examples of packet structures that may be used include BLE 1-Mbit and BLE 2-Mbit, among other packet structures. In some cases, a maximum capacity of the payload field may be 15 bytes when a BLE 1-Mbit packet is employed.

Figure 11:
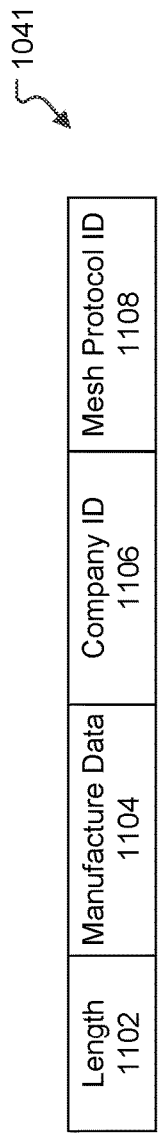
FIG. 11 illustrates an example of the mesh advertising data type header in accordance with one or more implementations.

FIG. 11 illustrates an example of the mesh AD type header 1041 in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The mesh AD type header 1041 may include a length field 1102, a manufacture data field 1104, a company ID field 1106, and a mesh protocol ID field 1108. The mesh AD type header 1041 may be 5 bytes. The length field may be equal to a size of a remaining portion of the mesh PDU structure 1040, not including the size of the length field 1102 itself. In some cases, the length field 1102 is the only field with a variable value. For example, the manufacture data field 1104, the company ID field 1106, and the mesh protocol ID field 1108 may be fixed value identifiers set to 0x0F, 0x000F, and 0x01, respectively.

Figure 12:
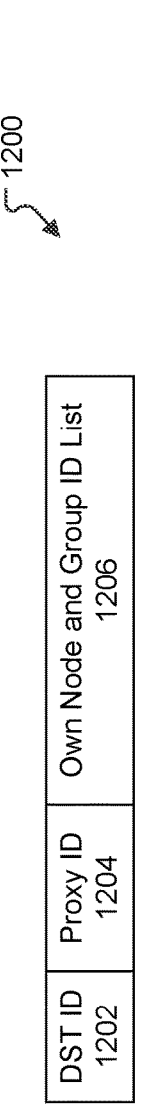
FIGS. 12 and 13 illustrate example packets that may be included as payload in a mesh packet in accordance with one or more implementations.

FIG. 12 illustrates an example packet 1200 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided. The packet 1200 may be utilized as the query packets that are sent (e.g., broadcasted) by the device 102F in FIGS. 2 through 4.

The packet 1200 may be referred to as a query packet or a Can-You-See-Me packet. The packet 1200 may be utilized by a requesting device as a query to determine reachability of the requesting device within the BLE automation mesh network 101. For example, the requesting device may consider that devices from which the requesting device receives a response packet to the packet 1200 are reachable by the requesting device. The reachability of the requesting device may also be referred to as a visibility of the requesting device. In one or more implementations, the packet 1200 is transmitted (e.g., broadcasted) periodically by some or all of the devices of the BLE automation mesh network 101. Periodically transmitting the packet 1200 may allow the devices of the BLE automation mesh network 101 to consistently remain updated regarding their respective reachability in the BLE automation mesh network 101. Each device of the BLE automation mesh network 101 may set its own time interval (e.g., query interval) between two query packets transmitted by the device. The time interval may be set based on a power profile associated with the device.

The packet 1200 may also be transmitted based on operation conditions of a device. For example, the device associated with the BLE automation mesh network 101 may be a mobile device (e.g., mobile phone) that is taken out of the BLE automation mesh network 101. When the mobile device returns to the BLE automation mesh network 101, the packet 1200 transmitted (e.g., broadcasted) by the mobile device may be received by other devices of the BLE automation mesh network 101. The mobile device may determine its reachability in the BLE automation mesh network 101 based on response packets from some or all of these other devices of the BLE automation mesh network 101.

The packet 1200 includes a destination ID field 1202, denoted as DST ID. The destination ID field 1202 may be 1 byte. The destination ID field 1202 may be set to a predetermined value or a value different from the predetermined value. For example, the predetermined value may be 0xFF. When the destination ID field 1202 is set to a non-0xFF value, the requesting device is looking for confirmation of a physical presence of a specified device associated with the non-0xFF value (e.g., a device with a node ID between 0 and 254). For example, the specified device may be associated with a node ID that matches the destination ID field 1202. In a case when the destination ID field 1202 is set to a non-0xFF value, the packet 1200 may be automatically forwarded back onto the BLE automation mesh network 101 until the packet 1200 reaches the device addressed in the destination ID field 1202. When the destination ID field 1202 is set to 0xFF, the requesting device is looking for full visibility of devices present within the BLE automation mesh network 101. In such a case, the packet 1200 is not forwarded.

With reference to Table 2, if the flags field 1048 of the mesh PDU structure 1040 of FIG. 10 has a Local Visibility Indicator set (e.g., set to 1), the requesting device is looking for a single hop visibility of the recipient devices. If the flags field 1048 does not have the Local Visibility Indicator set, the requesting device is looking for a full accumulated visibility map of the recipient devices.

The packet 1200 may include a proxy ID field 1204 and an own node and group ID list field 1206. In one or more implementations, the packet 1200 includes the proxy ID field 1204 and the own node and group ID list field 1206 when the burst mode indicator is set in the flags field 1048 of the mesh PDU structure 1040. Otherwise, the proxy ID field 1204 and the own node and group ID list field 1206 may be omitted. The proxy ID field 1204 may be 1 byte. The proxy ID field 1204 may include an identifier associated with a selected proxy device. For example, the proxy ID field 1204 may include a node ID of the proxy device. When the proxy device has not yet been selected, the proxy ID field 1204 may be set to a predetermined value indicating that a proxy device has not been selected. For example, the predetermined value may be 0xFF.

The requesting device that sends the packet 1200 may populate the own node and group ID list field 1206 indicating to the first hop devices a list of node IDs by which the requesting device is also identified in the BLE automation mesh network 101. For example, the requesting device may carry several assigned node IDs when the requesting device is a target to several applications, such as a baby monitor aperture settings or volume control. The requesting device may also be a member of a group with an associated group ID. The own node and group ID list field 1206 may aid the proxy device in determining which packets to queue for the requesting device. In some cases, the list does not include the SRC ID value contained in the source ID field 1044, since this value is already included in the mesh PDU structure 1040. The list may be empty if no alias IDs are associated with the requesting device. The own node and group ID list field 1206 may be 1 byte per entry.

Figure 13:
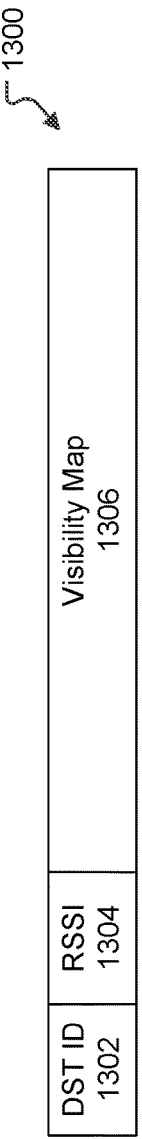

In one or more implementations, a packet, such as an example packet 1300 to be described with reference to FIG. 13, is sent to a requesting device by one or more devices of the BLE automation mesh network 101 in response to having received the packet 1200 from the requesting device. When the destination ID field 1202 is of the packet 1200 is set to 0xFF, all devices in a reachable range (e.g., an immediate reachable range) of the requesting device may send a query-response packet to the requesting device. When the destination ID field 1202 is set to a non-0xFF value, the device specified in the destination ID field 1202 may be the only device that sends a response packet to the requesting device.

In one or more implementations, when the Burst Mode Indicator bit in the flags field 1048 of the mesh PDU structure 1040 is set (e.g., set to 1) and the destination ID field 1202 of the packet 1200 is set to 0xFF, the devices that receive the packet 1200 may not always send a query-response packet to the requesting device. In such cases, the requesting device may be a low power sensor device or otherwise a device associated with limited battery power. With reference to FIGS. 4 and 7, for example, a device that receives a query packet (e.g., the packet 1200) may respond to the query packet when the device is a proxy device of the requesting device and/or the Proxy Solicitation Indicator bit is set (e.g., set to 1) in the flags field 1048 of the mesh PDU structure 1040.

FIG. 13 illustrates an example of the packet 1300 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different fewer components may be provided.

The packet 1300 may be used when responding to a device from which a query packet (e.g., the packet 1200) is received. The packet 1300 may be referred to as a query-response packet or an I-Can-See-You packet. The packet 1300 includes a destination ID field 1302, denoted as DST ID; an RSSI field 1304; and a visibility map field 1306. The destination ID field 1302, the RSSI field 1304, and the visibility map field 1306 may be 1 byte, 1 byte, and 32 bytes, respectively. The destination ID field 1302 contains the node ID of a device that originally transmitted the query packet. The RSSI field 1304 contains a value of the RSSI measurement performed on the received query packet by a device that received the query packet.

The visibility map field 1306 is a map of devices that are visible to the device receiving/consuming the query packet. Each of the devices may store information associated with its own visibility map. Visibility maps will be described later with reference to, for example, FIG. 16. In one or more implementations, the visibility map field 1306 is a 256-bit map of devices. In the 256-bit map, each of 255 of the bits may correspond to a device in the BLE automation mesh network 101, and a last bit (e.g., 0xFF) is reserved. In some aspects, larger visibility maps may be utilized in mesh networks that support more than 255 individual IDs. If the query packet was issued with a non-0xFF destination ID field (e.g., 1202), then the visibility map field 1306 may set the bits indicating which devices are immediately visible to (e.g., one hop away from) the requesting device. If the device identified by the destination ID field (e.g., 1202) is multiple hops away from the requesting devices, then intermediate devices may forward the query packet back onto the BLE automation mesh network 101 upon determining that the intermediate devices are not the target recipient of the query packet.

If the query packet was issued with a destination ID field (e.g., 1202) of 0xFF, then the visibility map field 1306 may set the bits indicating all devices visible to the device that is responding to the query packet. In this case, the responding devices generally do not forward the query packet through the BLE automation mesh network 101. The responding devices are immediately adjacent to (e.g., one hop away from) the requesting device respond to the requesting device. In some cases, the responding device only responds to query packets from first hop devices, which can be identified by the value in the network packet counter field 1042 of the mesh PDU structure 1040 shown in FIG. 10. With reference to FIGS. 2 through 9, in cases in which the mesh packets containing the query packet do not have a Burst Mode Indicator set (e.g., Burst Mode Indicator bit is set to 0), devices that receive the query packet may respond with the packet 1300.

Figure 14:
FIG. 14 illustrates an example of a network with two device islands that are isolated from each other.

FIG. 14 illustrates an example of a network with two device islands that are isolated from each other. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

Figure 15:
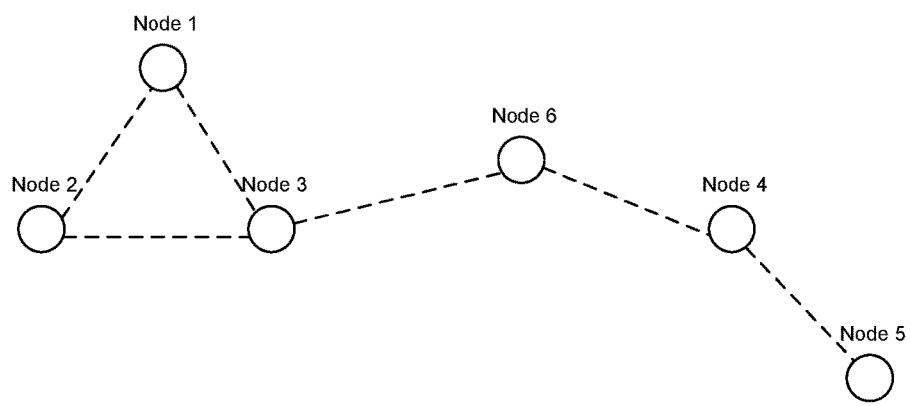
FIG. 15 illustrates the network of FIG. 14 with an additional device that forms a BLE automation mesh network in accordance with one or more implementations.

A first device island includes Node 1, Node 2, and Node 3. A second device island includes Node 4 and Node 5. FIG. 15 illustrates the network of FIG. 14 with an additional device that bridges the two device islands in accordance with one or more implementations. The addition of Node 6 connects the device islands of FIG. 14, allowing all participants in the network to be visible to each other.

Figure 16:
FIGS. 16 and 17 illustrate visibility maps for a device in a BLE automation mesh network in accordance with one or more implementations.
Figure 17:

FIGS. 16 and 17 illustrate visibility maps for a device in a mesh network in accordance with one or more implementations. Visibility maps may also be referred to as visibility tables, reachability maps, and reachability tables. The visibility maps are shown as two maps, where each square in each map corresponds to a potential device of the mesh network. For example, the leftmost square corresponds to Node 1, the second leftmost square corresponds to Node 2, and so forth. The visibility map may be a 256-bit map, with bit 0 to bit 254 corresponding to supported node IDs of the mesh network. Bit 255 may be reserved. FIG. 16 illustrates a visibility map of all devices that are reachable to Node 2 of FIG. 15. The devices reachable to Node 2 include Node 1, Node 3, Node, 4, Node 5, and Node 6. FIG. 17 illustrates a map of all devices that are directly adjacent to Node 2 of FIG. 4B. The devices directly adjacent to Node 2 include Node 1 and Node 3. The map of FIG. 17 provides the first hop visibility of Node 2. The visibility maps of FIGS. 16 and 17 may be stored in the Node 2. In some cases, the visibility maps of FIGS. 16 and 17 may also be stored in the central authority database.

If the flags field 1048 of a mesh PDU structure 1040 that includes a query packet as payload has the Local Visibility Indicator bit set (e.g., set to 1), the requesting device is looking for single hop visibility (e.g., the visibility map of FIG. 16) of the recipient devices. In such cases, the Local Visibility Indicator bit may also be set in the mesh PDU structure 1040 that includes a query-response packet. If the flags field 1048 does not have the Local Visibility Indicator bit set, the requesting device is looking for a full accumulated visibility map (e.g., the visibility map of FIG. 17) of the recipient devices and the query-response packet will not have the local visibility indicator bit set. The respective full accumulated visibility map of the recipient devices of the mesh network is generally identical to each other.

Exchanging of query packets (e.g., the packet 1200 of FIG. 12) and query-response packets (e.g., the packet 1300 of FIG. 13) may be utilized to discover devices of the BLE automation mesh network 101 and allow construction and refreshing of visibility tables of devices of the BLE automation mesh network 101. For example, the devices of the BLE automation mesh network 101 may send query packets periodically. In some cases, even when the node ID of a device receiving the query-response packet does not match the destination ID field 1302, the device may utilize the content of the visibility map field 1306 in the query-response packet to refresh a reachability table of the device.

In one or more implementations, a device needs to re-establish its presence within the BLE automation mesh network 101 when another device is added into the BLE automation mesh network 101, moved within the BLE automation mesh network 101, or removed and reintroduced into the BLE automation mesh network 101. A query packet (e.g., the packet 1200) may be issued at any time by any device in order to register its presence with all devices that are reachable.

The BLE automation mesh network 101 allows device mobility. If a particular device has moved within the BLE automation mesh network 101 (e.g., a user with a mobile platform moves from one room to another room in a house) and receives a query-response packet (e.g., the packet 1300) from devices that do not match a visibility table currently stored by the particular device, the particular device can determine that the particular device has been repositioned within the BLE automation mesh network 101. The trigger that causes a device to determine whether or not the device has moved can be from several inputs such as, by way of non-limiting example, global positioning system (GPS) coordinates have changed; signal strength indicators from, for example, WiFi, cellular network, and/or adjacent devices have changed; and/or platform sensors such as compass, gyroscope, and/or altimeter indicate movement. The transmitting of query packets (e.g., the packet 1200) and query-response packets (e.g., the packet 1300) may occur when movement is suspected to further facilitate deduction of an approximate location. Precision of the type of location may be dependent on how devices are deployed physically within the BLE automation mesh network 101.

In one or more implementations, the devices of the BLE automation mesh network 101 each have a corresponding visibility map. The reachability table may hold a map of all devices that are reachable within the BLE automation mesh network 101 for any single device and a map of all devices that are directly adjacent to (e.g., no intermediate hops in between) any single device. The map of devices that are reachable provides the local device a sense of with which devices the local device can immediately communicate. The map of devices that are directly adjacent provides the local device a sense of its physical position within the BLE automation mesh network 101. Each of the two maps of the visibility map may be held in a bit map. Each bit map can be 32 bytes.

The visibility table may be proactive. At a predefined, non-coordinated (e.g., with any other device) interval, a device may issue a query packet (e.g., the packet 1200). Response packets (e.g., the packet 1300) received from adjacent devices may refresh the content of the visibility map of the device that issued the query packet as well as the devices that issued the response packets. The predefined, non-coordinated interval may be 10 seconds for example. The device that periodically issues the query packet may be a higher powered device (e.g., a mains powered device), as opposed to a lower powered device (e.g., a battery powered device). The visibility map may be adaptively adjusted, e.g. to changes in presence, absence, and/or location of the various devices of the BLE automation mesh network 101. Any device may issue a query packet whenever the device determines that the query packet is necessary. For example, a device may determine that issuing a query packet is necessary when a user prompts for an update via a user interface input and/or when a platform detects movement.

With reference to FIGS. 12 and 13, the BLE automation mesh network 101 may allow for mesh discovery and forwarding as well as mesh node mobility and rediscovery, such as through the use of the packet 1200 and the packet 1300 shown in FIGS. 12 and 13, respectively. In one or more implementation, user payload may be included within a SCAN_REQ packet. This may facilitate relaying of messages traveling through the BLE automation mesh network 101 to a destination device via a proxy device, where the destination device is a low power sensor node that is, for the most part, in sleep mode. Devices of the BLE automation mesh network 101 can be provided with mechanisms for hardware accelerators forwarding and security aspects. Employing such mechanisms may reduce mesh hop and processing overhead. The BLE automation mesh network 101 may be compatible (e.g., can contain) with BLE L2CAP and GATT payloads. The BLE automation mesh network 101 may be used as a link layer transport for IPv6. The BLE automation mesh network 101 may be extended to cloud support, such as in Internet of Things (IoT). Mesh implementations may be utilized, such as IEEE 802.15.4, Zigbee, Bluetooth, 802.11, iPv6 over Low power Wireless Personal Area Networks (6LoWPAN), Ad hoc On-Demand Distance Vector (AODV), among others.

Figure 18:
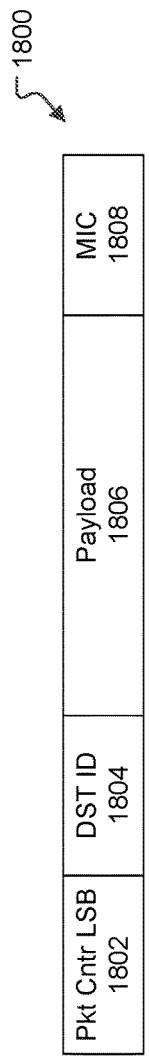

FIG. 18 illustrates an example of a packet 1800 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The packet 1800 may be utilized to facilitate secure communication between devices of the BLE automation mesh network 101. The packet 1800 may be referred to as a point-to-point secure packet. The packet 1800 may be utilized in a communication by a first device (e.g., an originator device) to a second device (e.g., a target device). Security provided by the packet 1800 is on top of BLE automation mesh network 101 security provided by the BLE link layer packet structure 1010 of FIG. 10, thereby providing another level of encryption and message authentication.

The packet 1800 includes a packet counter least significant byte (LSB) field 1802, denoted as Pkt Cntr LSB; a destination ID field 1804, denoted as DST ID; a payload field 1806; and an MIC field 1808. In one or more implementations, the point-to-point encryption covers all the fields in the packet 1800 except the packet counter LSB field 1802. In such cases, the packet counter LSB field 1802 is carried in clear text. The packet counter LSB field 1802 may be 1 byte, the destination ID field 1804 may be 1 byte, and the MIC field 1808 may be 4 bytes. The size of the payload field 1806 generally varies for different packets.

The packet counter LSB field 1802 may contain the least significant byte of the five byte packet counter (e.g., the network packet counter field 1042 in FIG. 10), where the packet counter serves as part of a nonce for the encryption and authentication process (e.g., AES-CCM encryption and authentication process). The destination ID field 1804 may contain the node ID of the target device to which content of the payload field 1806 is addressed. The packet 1800 may be automatically forwarded back onto the BLE automation mesh network 101 except by the target device. The target device may consume the content of the packet 1800 (e.g., the content of the payload field 1806).

The payload field 1806 may carry user payload. The payload field 1806 may carry Generic Attribute Profile (GATT) PDUs. In such cases, if a write action is being performed and an acknowledgement is required by the originating device, then a GATT write request with response should be issued. If a read action is being performed, then the result of the read serves as the acknowledgement to the originating device. The MIC field 1808 may contain the CCM message authentication code calculated over the entire packet 1800 except the packet counter LSB field 1802. In some cases, the payload field 1806 is a logical link control and adaptation protocol (L2CAP) payload.

Figure 19:
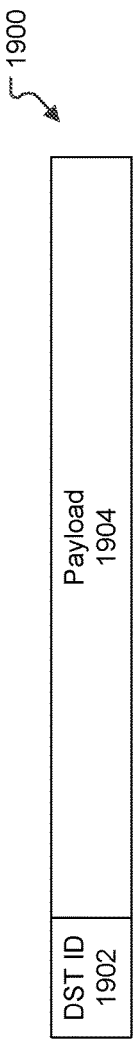

FIG. 19 illustrates an example of a packet 1900 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The packet 1900 may be utilized as a baseline packet within a BLE automation mesh to facilitate secure communication between devices of the BLE automation mesh network 101. The packet 1900 may be utilized to direct payload (e.g., a user payload) originating from a device (e.g., an originating device) of the BLE automation mesh network 101 to a group ID (e.g., a group of devices) or to a specific node ID. The packet 1800 may be referred to as a point-to-multipoint packet.

Transmission of the packet 1900 is protected by encryption and authentication (e.g., AES-CCM encryption and authentication) under a mesh network key. The packet 1900 includes a destination ID field 1902, denoted as DST ID, and a payload field 1904. The destination ID field 1902 may be 1 byte. A DST ID of a predetermined value (e.g., 0xFF) may be used when payload content is targeted to all devices within the BLE automation mesh network 101. Targeting all devices of the BLE automation mesh network 101 may be utilized for activities such as facilitating distribution of mesh node identification (e.g., redistribution of network keys), firmware updates, and/or other mesh wide configuration activities.

The payload field 1904 may carry user payload. The payload field 1904 may carry GATT PDUs. In such cases, if a write action is being performed and an acknowledgement is required by the originating device, then a GATT write request with response should be issued. If a read action is being performed, then the result of the read serves as the acknowledgement to the originating device. Reads or writes with response to groups of devices (e.g., associated with group IDs) cause responses from each participant device to be generated. In some cases, the payload field 1904 is a L2CAP payload.

FIG. 20 illustrates an example packet 2000 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The packet 2000 may be utilized to allow control of one device or several devices of the network at once. The devices to be controlled are identified by unique node IDs or group IDs. The packet 2000 may be referred to as a point-to-multi-actuator packet. Transmission of the packet 2000 is protected with encryption and authentication (e.g., AES-CCM encryption and authentication) under the mesh network key.

Individual settings may be applied to each device or device group identified in the packet 2000. The settings may be the same or can be different between the different node IDs or groups IDs. In some cases, the packet 2000 may include one destination ID and one control field. The packet 2000 includes a number of destination ID fields (e.g., the destination ID fields 2002, 2006, 2010), denoted as DST ID, and a number of control fields (e.g., the control fields 2004, 2008, 2012), denoted as CTRL. The number of destination ID fields and the number of control fields may be the same. Each of the destination ID fields may be 1 byte and each of the control fields may be 1 byte. In such a case, the control field can be referred to as a control byte.

The destination ID field (e.g., the destination ID field 2002) contains the node ID of a target device or a group ID for a target group of devices. The packet 2000 may be automatically forwarded back onto the BLE automation mesh network 101 by each receiving mesh node (except by the target device or the target set of devices) to facilitate forwarding of the packet 2000 to the target device or the target set of devices. The control field (e.g., the control field 2004) contains control information for the target device or target group of devices. The control fields 2004, 2008, and 2012 may contain the control information for the device identified in the destination ID field 2002, 2006, and 2010, respectively. For example, the control field 2004 may contain instructions for a device or group of devices associated with the destination ID field 2002 that, when executed by the device(s), cause the device(s) to turn off.

In one or more implementations, no acknowledgement is sent back to the originating device regarding whether the packet 2000 reached the target device or target group of devices and/or whether the intended action(s) specified in the packet 2000 were taken. If the originating device requires confirmation of an action, the originating device may set an Acknowledgement Request Indicator bit in a flags field 1048 of a mesh PDU structure 1040 that contains the packet 2000. Alternatively or in addition, the originating device may transmit (e.g., broadcast) packets such as packets 1800 and 1900 shown in FIGS. 18 and 19, respectively, to read the status of the target devices and/or target group of devices.

FIG. 21 illustrates an example of a packet 2100 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The packet 2100 may be utilized to facilitate secure communication of acknowledgements between devices of the BLE automation mesh network 101. The packet 2100 may be sent by a first device of the BLE automation mesh network 101 that has successfully received and authenticated the packet 1800, where packet 1800 has its Acknowledgement Request Indicator bit set. The packet 2100 may be referred to as a point-to-point secure acknowledgement packet. Security provided by the packet 2100 is on top of mesh network security provided by the BLE link layer packet structure 1010 of FIG. 10, thereby providing another level of encryption and message authentication. The packet 2100 may be automatically forwarded back onto the BLE automation mesh network 101 by each receiving mesh node except by the target device.

The packet 2100 includes a packet counter LSB field 2102, denoted as Pkt Cntr LSB; a destination ID field 2104, denoted as DST ID; a payload field 2106; and an MIC field 2108. The destination ID field 2104 may include a node ID of the device to which the acknowledgement is targeted. In one or more implementations, the point-to-point encryption covers all the fields in the packet 2100 except the packet counter LSB field 2102. In such cases, the packet counter LSB field 2102 is carried in clear text. The packet counter LSB field 2102 may be 1 byte, the destination ID field 2104 may be 1 byte, and the MIC field 2108 is may be 4 bytes. The size of the payload field 2106 generally varies for different packets. The payload field 2106 may carry GATT PDUs. The foregoing fields of the packet 2100 are similar to the corresponding fields of the packet 1800. Thus, the description of these fields from FIG. 18 applies to FIG. 21.

The packet 2100 also includes a network packet counter LSB field 2110, denoted as Net Pkt Cntr LSB. The network packet counter LSB field 2110 may contain a least significant byte of the five byte of the network packet counter field 1042 of the mesh PDU structure 1040 that contained the packet 1800 with the Acknowledgement Request Indicator bit set (e.g., set to 1). The value utilized by the network packet counter LSB field 2110 may be similar to a transaction ID value and may be used to associate the acknowledgment (e.g., the packet 2100) with the packet (e.g., the packet 1800) that is being acknowledged. The network packet counter LSB field 2110 is 1 byte. In some cases, the packet 2100 may have an Acknowledgement Request Indicator bit that is set (e.g., set to 1), which may cause chaining of a longer exchange of mesh packets.

FIG. 22 illustrates an example of a packet 2200 that may be included as payload in a mesh packet in accordance with one or more implementations. The mesh packet may have the BLE link layer packet structure 1010 shown in FIG. 10. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The packet 2200 may be utilized to facilitate secure communication of acknowledgements between devices of the BLE automation mesh network 101. The packet 2200 may be sent by a first device of the BLE automation mesh network 101 that has successfully received and authenticated the packet 1900 or the packet 2000, where the received and authenticated packet has the Acknowledgement Request Indicator bit set. The packet 2200 may be referred to as a point-to-point acknowledgement packet. The packet 2200 may be automatically forwarded back onto the BLE automation mesh network 101 by each receiving mesh device except by the target device.

The packet 2200 includes a destination ID field 2202, denoted as DST ID, and a payload field 2204. The destination ID field 2202 may include a node ID of the device to which the acknowledgement is targeted. The destination ID field 2202 may be 1 byte. The size of the payload field 2204 generally varies for different packets. The payload field 2204 may carry GATT PDUs. The foregoing fields of the packet 2200 are similar to the corresponding fields of the packet 1900 of FIG. 19. Thus, the description of these fields from FIG. 19 may also apply to FIG. 22.

The packet 2200 also includes a network packet counter LSB field 2206, denoted as Net Pkt Cntr LSB. The network packet counter LSB field 2206 may contain a least significant byte of the five byte of the network packet counter field 1042 of the mesh PDU structure 1040 that contained the packet 1900 with the Acknowledgement Request Indicator bit set (e.g., set to 1). The value utilized by the network packet counter LSB field 2206 may be similar to a transaction ID value and may be used to associate the acknowledgment (e.g., the packet 2200) with the packet (e.g., the packet 1900) that is being acknowledged. The network packet counter LSB field 2206 is 1 byte. In some cases, the packet 2200 may have an Acknowledgement Request bit that is set (e.g., set to 1), which may cause chaining of a longer exchange of mesh packets. In some cases, a device that sends a packet with an Acknowledgement Request Indicator bit should expect multiple acknowledgement packets (e.g., the packet 2200) if the packet with the Acknowledgement Request Indicator bit set was addressed to a group ID and/or was addressed to multiple node IDs.

In one or more implementations, devices of the BLE automation mesh network 101 may set a rebroadcast count when transmitting (e.g., broadcasting) packets. For example, a same packet 1800 may be transmitted (e.g., broadcasted) the number of times equal to the rebroadcast count to allow higher likelihood that the packet 1800 is received by a destination device.

In one or more implementations, a device encrypts and authenticates on a point-to-point link and encrypts and authenticates on a network basis. Point-to-point may also be referred to as peer-to-peer. For devices that may not be operated with this capability, host processing power for security functions may be increased, which may cause decreased battery life (e.g., in battery-operates devices) and/or added latency. A device may utilize an AES engine in a calculator mode to generate a message authentication code. In some cases, a device may be operated without the ability for message authentication dependent on security considerations. In other cases, the device needs to have the ability for message authentication from a security standpoint. Point-to-point security is utilized, for example, in the packet 1800 and packet 2100 of FIGS. 18 and 21, respectively.

Figure 23:
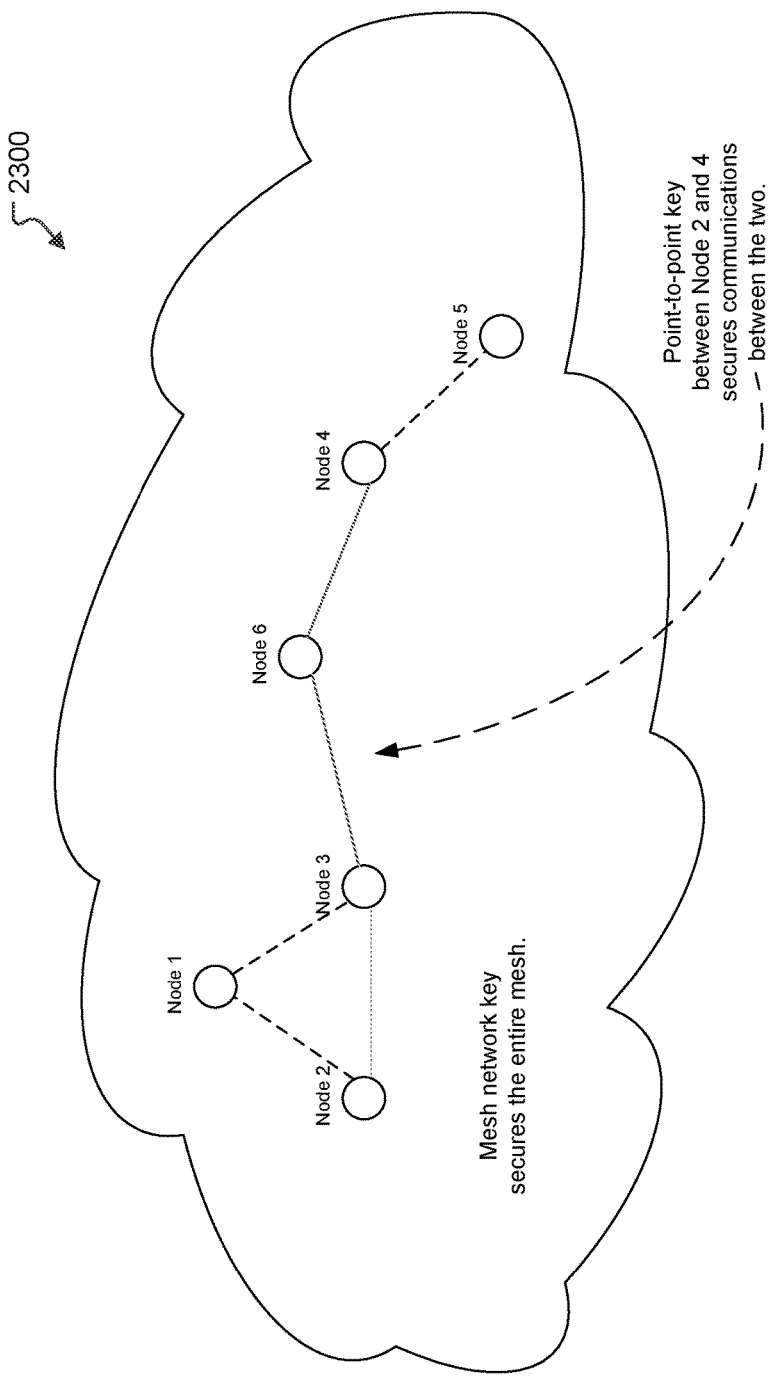
FIG. 23 illustrates an example BLE automation mesh network that uses mesh keys to protect the mesh network in accordance with one or more implementations.

FIG. 23 illustrates an example mesh network 2300 that uses mesh keys to protect the mesh network 2300, in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, fewer, and/or different components may be provided.

The mesh keys may include a mesh network key that secures the entire mesh network 2300. The mesh keys may also be referred to as encryption keys. The mesh network key may also be referred to as a network wide key. The mesh keys may also include identity resolving keys utilized for address filtering and aliasing. The mesh network key may be used as a boundary defense to keep non-participants off of the mesh network 2300. Using the mesh network key, the mesh networks forward traffic through the mesh network only when the traffic is first authenticated properly. The mesh network key may be used to secure message content traveling through the mesh network 2300.

The mesh keys may also include a point-to-point key to additionally protect point-to-point communications between any two devices. A point-to-point key can also be established to secure communications between any two devices in the mesh from other mesh network participants. In point-to-point security, encryption and authentication occurs at the point-to-point level in addition to mesh network-level encryption and authentication. Thus, point-to-point payload data, such as payload contained in the payload field 1806 and the payload field 2106 of FIGS. 18 and 21, may be encrypted using AES-CCM encryption. In FIG. 23, a peer-to-peer key between Node 2 and Node 4 may allow secure communications between the Node 2 and Node 4. Although the forgoing description pertains to point-to-point keys, other types of keys, such as point-to-multipoint, multipoint-to-point, and/or multipoint-to-multipoint keys, may also be utilized. For example, the multipoint-to-multipoint key may be utilized to allow devices of a certain group ID to securely communicate with devices of another group ID.

In one or more implementations, the mesh network utilizes a central authority database. There may be only one central authority database in any one mesh network. Information contained in the central authority database may include, by way of non-limiting examples, common network mesh keys, listing of all participant devices and related operational characteristics, device group membership lists, and CCM packet counter distribution. The listing of participant devices may identify each individual node as being a wall switch, a door sensor, a remote control, etc.

The common network mesh keys may include the link keys that are used to encrypt and authenticate traffic traveling through the mesh network. The list of participant devices may be a comprehensive list of device membership and device characteristics. The device group membership lists can hold various defined groups of devices. A group of devices can be associated with upstairs lights, house door locks, and so forth.

The mesh network and mesh packets transmitted in the mesh network may be associated with a security mechanism. The security mechanism may include, by way of non-limiting example, encryption, authentication, anonymization, data integrity, and so forth. The mesh network may utilize AES-CCM encryption and authentication. In some cases, the mesh packet may be associated with multiple layers of security. For example, the packet 1800 provides security on top of security provided by the BLE link layer packet structure 1010 of FIG. 10. In one or more implementations, the security may be based on the Bluetooth 4.1 specification. A procedure for establishing local security database between any two devices can be common across the devices in the mesh network. The central authority database may be administered by at least one administrator device of the mesh network.

In one or more implementations, an administrator device (e.g., an administering smart platform) may add a device into the mesh network and may create a point-to-point BLE link with the device to be added. With the creation of the point-to-point BLE link, the administrator device and the device to be added can pair and bond like two BLE devices generally can. During a security manager key distribution phase, the administrator device may exchange information with the device to be added, including a mesh network key, a device specific allocation of a unique network packet counter, and an initialization vector. Thus, the administrator device may be utilized to allow mesh joining/bonding and key distribution. In one or more implementations, the mesh network key is 128 bits, the network packet counter is a 5-octet value, and the initialization vector is an 8-octet vector. Once a device has been added as a device of the mesh network, the device may encrypt and authenticate payloads that the device sends across the mesh network when the device communicates across the mesh network.

A BLE automation mesh CCM nonce may be constructed from the network packet counter value (e.g., 5-octet value) and the initialization vector (e.g., 8-octet). The CCM nonce can be used to provide a unique input to the encryption and authentication procedure for payload content transmitted from any mesh device. Table 3 shows an example construction of the CCM nonce.

TABLE 3

CCM nonce format

| Octet | Description |
| --- | --- |
| 0 | Octet 0 of network packet counter |
| 1 | Octet 1 of network packet counter |
| 2 | Octet 2 of network packet counter |
| 3 | Octet 3 of network packet counter |
| 4 | Octet 4 of network packet counter |
| 5 | Octet 0 of initialization vector |
| 6 | Octet 1 of initialization vector |
| 7 | Octet 2 of initialization vector |
| 8 | Octet 3 of initialization vector |
| 9 | Octet 4 of initialization vector |
| 10 | Octet 5 of initialization vector |
| 11 | Octet 6 of initialization vector |
| 12 | Octet 7 of initialization vector |

In one or more implementations, when a BLE automation mesh network is created, a network wide pool of packet counter values can be initialized. The pool of packet counter values may be referred to as a CCM packet counter distribution. For a 5-byte (40 bit) network packet counter value, the entire space of the 5 byte network packet counter value may provide a total of $2^{40}$ (1,099,511,627,776) unique values across the network. Each value may only be used once (e.g., to encrypt and authenticate a single packet) during the life of the mesh network key and initialization vector. In these implementations, either a new mesh network key or initialization vector is established through the mesh network when the network packet counter number space is exhausted or near exhaustion.

In one or more implementations, when a device is added to the mesh network, the device is allocated a portion of the network packet counter number space from the central authority database. A 5-octet network packet counter number space may be divided into 512 buckets/blocks and allocated from the central authority database to devices when the devices join the mesh network. Each device may be assigned one bucket such that the device utilizes a number space associated with the assigned block. If the number space of one bucket is exhausted for a certain device, the device may be assigned a number space associated with another of the 512 buckets. This allocation can allow each device to transmit $2^{40}/512$ (2,147,483,648) individual payloads through the mesh network during the lifetime of the mesh network.

When a packet is transmitted through the mesh network from any one node, the BLE link layer packet structure 1010 depicted in FIG. 10 may be used. In the mesh PDU structure 1040, the network packet counter field 1042 may include the network packet counter values (e.g., 5-octet values) used by the node to encrypt and authenticate packet content. The network packet counter field 1042 may be transmitted in clear text. The other fields of the mesh PDU structure 1040 may be encrypted and authenticated using the exchanged mesh network key as the CCM nonce. In one or more implementations, the CCM nonce is constructed in part by the network packet counter value and an exchanged initialization vector.

Maintenance and distribution of database contents may be utilized in a BLE automation mesh to facilitate orderly and cooperative operation within the mesh network. A mesh specific database may be held in the central authority database. In some cases, distribution of the content in the mesh specific database is only possible through administrator nodes that have access to the central authority database. Distribution may occur under a point-to-point secure link between an administrator node and each device as the device joins the mesh network. A mesh network security database may hold content that allow use of encryption and message authentication (e.g., AES-CCM encryption and message authentication) on a mesh wide basis. The central authority database may be, or may include, the mesh network security database. A mesh network key can be used along with encryption and message authentication (e.g., AES-CCM encryption and message authentication) to provide mesh wide confidentiality and message authentication. The mesh network key may be a 128-bit key.

In one or more implementations, the subject technology allows for the mesh network to be provided with a multi-level security model. Mesh participants may be allowed to discard non-mesh payloads at a lower media access control (MAC) level. Such interaction may provide efficient (e.g., power conservative) coexistence between mesh participants and non-mesh participants. The mesh network may be provided with mesh wide network security. The mesh network may be provided with device point-to-point security within a second layer under the mesh wide network security. In some cases, a mesh identity resolving key may be utilized.

A node of the mesh network may allow for extended advertisement payload lengths. A node that does not allow for extended advertisement payload lengths may have limited mesh member capacity and/or limited mesh communication capacity. A node of the mesh network may allow for hardware assisted Resolvable Private Address (RPA) support. Nodes may be allowed to reject non-mesh BLE packets very low in the BLE MAC architecture. In one or more implementations, the device might not allow for RPA support, which may increase processing power required and/or may adversely impact device power profile. In such implementations, filtering capability may be provided higher up in the MAC function. The host processor may provide the filtering capability in some cases. RPA may be utilized for address filtering. The address filtering may be performed by comparing a BD_ADDR contained in a packet against an identity resolving key.

In one or more implementations, the subject technology provides a packet structure for BLE device address and header compression. The mesh network may allow for mesh discovery and forwarding as well as mesh node mobility and rediscovery, such as through the use of the packet 1200 and the packet 1300 shown in FIGS. 12 and 13, respectively. In one or more implementation, user payload may be included within a SCAN_REQ packet. This may facilitate relaying of messages traveling through the mesh network to a destination node via a proxy node, where the destination node is a small sensor node that is, for the most part, in sleep mode. Nodes of the mesh network can be provided with mechanisms for hardware accelerators forwarding and security aspects. Employing such mechanisms may reduce mesh hop and processing overhead. The mesh network may be compatible (e.g., can contain) with BLE L2CAP and GATT payloads. The mesh network may be used as a link layer transport for IPv6. The mesh network may be extended to cloud support, such as in Internet of Things (IoT). Mesh implementations may be utilized, such as IEEE 802.15.4, Zigbee, Bluetooth, 802.11, IPv6 over Low power Wireless Personal Area Networks (6LoWPAN), Ad hoc On-Demand Distance Vector (AODV), among others.

Figure 24:
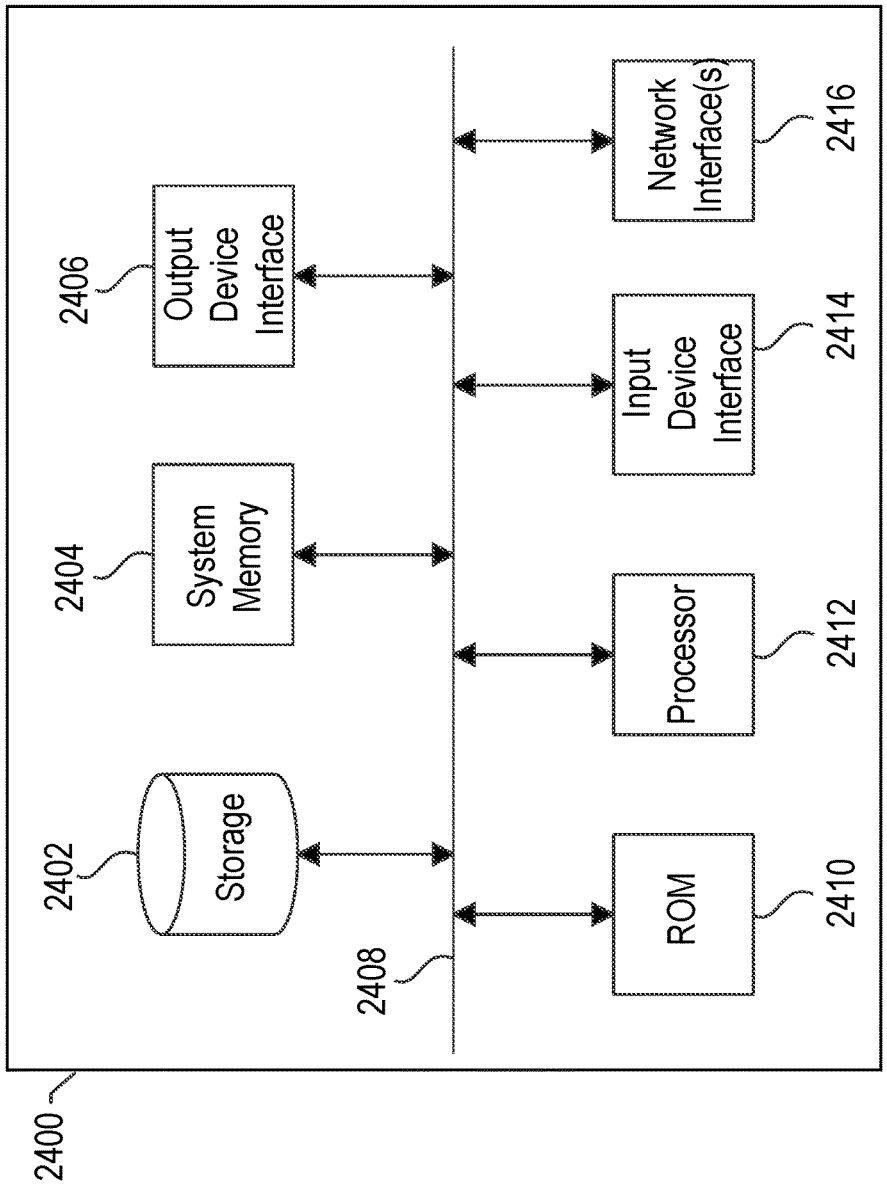
FIG. 24 conceptually illustrates an electronic system with which one or more implementations of the subject technology may be implemented.

FIG. 24 conceptually illustrates an electronic system 2400 with which one or more implementations of the subject technology may be implemented. The electronic system 2400, for example, can be a desktop computer, a laptop computer, a tablet computer, a server, a switch, a router, a base station, a receiver, a phone, a personal digital assistant (PDA), a gateway device, or generally any electronic device. The electronic system 2400 may be any device of a mesh network, such as any one of the BLE devices 102A-G of FIG. 1. The electronic system 2400 may transmit signals over a network and/or transmit signals to other electronic systems. Such an electronic system includes various types of computer readable media and interfaces for various other types of computer readable media. The electronic system 2400 includes a bus 2408, one or more processing unit(s) 2412, a system memory 2404 (and/or buffer), a read-only memory (ROM) 2410, a permanent storage device 2402, an input device interface 2414, an output device interface 2406, and one or more network interfaces 2416, or subsets and variations thereof.

The bus 2408 collectively represents all system, peripheral, and chipset buses that communicatively connect the numerous internal devices of the electronic system 2400. In one or more implementations, the bus 2408 communicatively connects the one or more processing unit(s) 2412 with the ROM 2410, the system memory 2404, and the permanent storage device 2402. From these various memory units, the one or more processing unit(s) 2412 retrieves instructions to execute and data to process in order to execute the processes of the subject disclosure. The one or more processing unit(s) 2412 can be a single processor or a multi-core processor in different implementations.

The ROM 2410 stores static data and instructions that are needed by the one or more processing unit(s) 2412 and other modules of the electronic system 2400. The permanent storage device 2402, on the other hand, may be a read-and-write memory device. The permanent storage device 2402 may be a non-volatile memory unit that stores instructions and data even when the electronic system 2400 is off. In one or more implementations, a mass-storage device (such as a magnetic or optical disk and its corresponding disk drive) may be used as the permanent storage device 2402.

In one or more implementations, a removable storage device (such as a floppy disk, flash drive, and its corresponding disk drive) may be used as the permanent storage device 2402. Like the permanent storage device 2402, the system memory 2404 may be a read-and-write memory device. However, unlike the permanent storage device 2402, the system memory 2404 may be a volatile read-and-write memory, such as random access memory. The system memory 2404 may store any of the instructions and data that one or more processing unit(s) 2412 may need at runtime. In one or more implementations, the processes of the subject disclosure are stored in the system memory 2404, the permanent storage device 2402, and/or the ROM 2410. From these various memory units, the one or more processing unit(s) 2412 retrieves instructions to execute and data to process in order to execute the processes of one or more implementations.

The bus 2408 also connects to the input and output device interfaces 2414 and 2406. The input device interface 2414 enables a user to communicate information and select commands to the electronic system 2400. Input devices that may be used with the input device interface 2414 may include, for example, alphanumeric keyboards and pointing devices (also called "cursor control devices"). The output device interface 2406 may enable, for example, the display of images generated by electronic system 2400. Output devices that may be used with the output device interface 2406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 24, the bus 2408 also couples the electronic system 2400 to a network (not shown) through the one or more network interface(s) 2416. In this manner, the electronic system 2400 can be a part of a mesh network, such as a BLE automation mesh network, a network of computers (such as a local area network ("LAN"), a wide area network ("WAN"), or an Intranet, or a network of networks, such as the Internet. Any or all components of the electronic system 2400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising: a memory; and at least one processor configured to: transmit a plurality of proxy query packets; receive, in response to the plurality of proxy query packets, at least one or more respective proxy response packets from each of a plurality of devices of a mesh network, wherein the at least one or more respective proxy response packets is associated with a power value corresponding to each of the plurality of devices, respectively; count a number of the at least one or more respective proxy response packets received from each of the plurality of devices, wherein at least two proxy response packets are received from at least one of the plurality of devices; and select another device of the plurality of devices as a proxy device for the device in the mesh network based at least on the counted number of the at least one or more respective proxy response packets received from the selected another device relative to the counted numbers of the at least one or more respective proxy response packets received from each of the other devices of the plurality of devices, and the power value corresponding to the each of the plurality of devices.

2. The device of claim 1, wherein the at least one processor is further configured to:
transition the device to a low power state after selecting the other device of the plurality of devices as the proxy device.

3. The device of claim 2, wherein the at least one processor is further configured to:
transition the device from the low power state to a higher power state after a first period of time has elapsed;
transmit a first query packet to the other device of the plurality of devices, wherein the first query packet comprises a first identifier associated with the other device;
when a mesh packet is not received from the other device after a second period of time from transmitting the first query packet, transition the device back to the low power state; and
when the mesh packet is received from the other device within the second period of time from transmitting the first query packet, transmit a second query packet to the other device, wherein the second query packet comprises the first identifier and an acknowledgement of the mesh packet.

4. The device of claim 3, wherein the at least one processor is further configured to:
determine, in response to receiving the mesh packet, whether at least one additional mesh packet will be subsequently transmitted by the other device to the device based at least in part on an indicator bit of the mesh packet; and
maintain the device at the higher power state when the at least one additional mesh packet will subsequently be transmitted by the other device to the device, otherwise transition the device back to the low power state.

5. The device of claim 4, wherein the at least one processor is further configured to adjust a receiver duty cycle of the device based at least in part on the indicator bit of the mesh packet.

6. The device of claim 5, wherein the at least one processor is configured to adjust the receiver duty cycle of the device by increasing the receiver duty cycle of the device when the indicator bit of the mesh packet is set to a first value indicating that the at least one additional mesh packet will be subsequently transmitted by the other device to the device.

7. The device of claim 6, wherein the at least one processor is configured to adjust the receiver duty cycle of the device by decreasing the receiver duty cycle of the device when the indicator bit is set to a second value different from the first value.

8. The device of claim 1, wherein the at least one processor is further configured to determine a map comprising information of active online devices of the mesh network based at least on the respective response packet received from each of the plurality of devices of the mesh network.

9. The device of claim 8, wherein the information comprises the active online devices of the mesh network that are first hop devices of the device.

10. A method, comprising: transmitting, by a first device of a mesh network, a proxy query packet; receiving, by the first device, one or more respective proxy response packets from each of a plurality of devices of the mesh network, wherein each of the one or more respective proxy response packets is associated with a power value corresponding to each of the plurality of devices, respectively, and at least two respective proxy response packets are received from at least one of the plurality of devices; and selecting, by the first device, a second device of the plurality of devices as a proxy device for the first device based at least on a comparison of a count of the one or more respective proxy response packets received from each of the plurality of devices, and the power value corresponding to the each of the plurality of devices.

11. The method of claim 10, further comprising:
transitioning, by the first device, to a low power state after selecting the second device of the plurality of devices as the proxy device.

12. The method of claim 11, further comprising:
transitioning, by the first device, from the low power state to a higher power state after a first period of time has elapsed;
transmitting, by the first device, a first query packet to the second device of the plurality of devices, wherein the first query packet comprises a first identifier associated with the second device;
when a mesh packet is not received from the second device after a second period of time from transmitting the first query packet, transitioning, by the first device, back to the low power state; and when the mesh packet is received from the second device within the second period of time from transmitting the first query packet, transmitting a second query packet to the second device, wherein the second query packet comprises the first identifier and an acknowledgement of the mesh packet.

13. The method of claim 12, further comprising:

determining, by the first device and in response to receiving the mesh packet, whether at least one additional mesh packet will be subsequently transmitted by the second device to the first device based at least in part on an indicator bit of the mesh packet; and remaining, by the first device, at the higher power state when the at least one additional mesh packet will subsequently be transmitted by the second device to the first device, otherwise transitioning, by the first device, back to the low power state.

14. The method of claim 13, further comprising adjusting a receiver duty cycle of the first device based at least in part on the indicator bit of the mesh packet.

15. The method of claim 14, wherein the adjusting comprises increasing the receiver duty cycle of the first device when the indicator bit of the mesh packet is set to a first value indicating that the at least one additional mesh packet will be subsequently transmitted by the second device to the first device.

16. The method of claim 15, wherein the adjusting comprises decreasing the receiver duty cycle of the first device when the indicator bit is set to a second value different from the first value.

17. The method of claim 10, further comprising determining, by the first device, a map comprising information of active online devices of the mesh network based at least on the respective response packet received from each of the plurality of devices of the mesh network.

18. The method of claim 17, wherein the information comprises the active online devices of the mesh network that are first hop devices of the first device.

19. A computer program product comprising instructions stored in a non-transitory computer-readable storage medium, the instructions comprising: instructions to transmit, by a first device of a mesh network, a plurality of proxy query packets; instructions to receive, in response to the plurality of proxy query packets, at least one or more respective proxy response packets from each of a plurality of devices of the mesh network, wherein the at least one or more respective proxy response packets is associated with a power value corresponding to each of the plurality of devices, respectively; instructions to count a number of the at least one or more respective proxy response packets received from each of the plurality of devices, wherein at least two proxy response packets are received from the at least one of the plurality of devices; and instructions to select a second device of the plurality of devices as a proxy device for the first device based at least on a comparison of the respective counted number of the at least one or more respective proxy response packets received from each of the plurality of devices and the power value corresponding to the each of the plurality of devices.

20. The computer program product of claim 19, the instructions further comprising: instructions to receive, by the first device, a mesh packet from the second device, wherein the mesh packet comprises an indicator bit that indicates whether at least one additional packet will be subsequently transmitted by the second device to the first device.

* * * * *